US012757236B2

(12) United States Patent
Cao et al.

(10) Patent No.: US 12,757,236 B2
(45) Date of Patent: Oct. 6, 2026

(54) SUPPLEMENTARY UPLINK SWITCHING FOR SWITCHING MULTIPLE RADIO FREQUENCY BANDS

(71) Applicant: QUALCOMM Incorporated, San Diego, CA (US)

(72) Inventors: Yiqing Cao, Beijing (CN); Peter Gaal, San Diego, CA (US); Wanshi Chen, San Diego, CA (US); Juan Montojo, San Diego, CA (US); Timo Ville Vintola, San Diego, CA (US); Bin Han, Beijing (CN); Alberto Rico Alvarino, San Diego, CA (US); Yi Huang, San Diego, CA (US); Yan Li, Beijing (CN); Zhimin Du, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 18/692,142

(22) PCT Filed: Nov. 12, 2021

(86) PCT No.: PCT/CN2021/130298
§ 371 (c)(1),
(2) Date: Mar. 14, 2024

(87) PCT Pub. No.: WO2023/082174
PCT Pub. Date: May 19, 2023

(65) Prior Publication Data
US 2024/0340937 A1 Oct. 10, 2024

(51) Int. Cl.
*H04W 72/51* (2023.01)
*H04W 72/0453* (2023.01)

(52) U.S. Cl.
CPC ....... *H04W 72/51* (2023.01); *H04W 72/0453* (2013.01)

(58) Field of Classification Search
CPC ... H04L 5/0091; H04L 5/0094; H04L 5/0098; H04L 5/001; H04L 5/14; H04W 72/51;
(Continued)

(56) References Cited

U.S. PATENT DOCUMENTS 8,462,724 B1 6/2013 Immonen et al.
2018/0219652 A1* 8/2018 Chen .................... H04L 5/0091
(Continued)

FOREIGN PATENT DOCUMENTS

CN 107667557 A 2/2018
CN 108055698 A 5/2018
(Continued)

OTHER PUBLICATIONS

Moderator (China Telecom): “Summary of Rel-16 uplink Tx switching”, R1-2101782, 3rd Generation Partnership Project, Mobile Competence Centre, 650, Route Des Lucioles, F-06921 Sophia-antipolis Cedex, France, vol. RAN WG1, No. e-Meeting, Jan. 25, 2021-Feb. 5, 2021, Jan. 25, 2021, XP051975884, 4 Pages, sections 1-3.
(Continued)

*Primary Examiner* — Khoa Huynh
(74) *Attorney, Agent, or Firm* — Holland & Hart LLP /Qualcomm

(57) ABSTRACT

Methods, systems, and devices for wireless communications are described. A user equipment (UE) switch between carriers of a group of a carriers during uplink communications in accordance with a mapping. For example, the UE may report its capability to a base station for switching between carriers of the group, where the group includes a supplementary uplink (SUL) carrier and two or more normal uplink (NUL) carriers that are each associated with a different radio frequency band. The base station may indicate for the UE to switch to a subset of carriers of the group
(Continued)

corresponding to a combination of radio frequency bands for transmission of an uplink message. The UE may switch to at least one carrier of the subset of carriers in accordance with a mapping that is based on the reported capability and may transmit the uplink message on the at least one carrier.

30 Claims, 17 Drawing Sheets

(58) Field of Classification Search
CPC ... H04W 72/0453; H04W 8/24; H04W 72/20; H04W 72/23
See application file for complete search history.

(56) References Cited

U.S. PATENT DOCUMENTS

| | | | | |
|---|---|---|---|---|
| 2019/0082352 | A1* | 3/2019 | Hua | H04W 76/15 |
| 2019/0313298 | A1 | 10/2019 | Rico Alvarino et al. | |
| 2020/0045685 | A1 | 2/2020 | Rico Alvarino et al. | |
| 2021/0226761 | A1 | 7/2021 | Pezeshki et al. | |
| 2021/0274483 | A1* | 9/2021 | Zhang | H04W 72/23 |
| 2021/0385836 | A1* | 12/2021 | Ye | H04W 16/14 |
| 2022/0278784 | A1* | 9/2022 | Chen | H04L 5/14 |
| 2023/0188306 | A1 | 6/2023 | Nory et al. | |
| 2024/0031114 | A1 | 1/2024 | Wang et al. | |
| 2025/0126531 | A1 | 4/2025 | Cao et al. | |
| 2025/0247847 | A1 | 7/2025 | Xu et al. | |

FOREIGN PATENT DOCUMENTS

| | | | |
|---|---|---|---|
| CN | 109728890 | A | 5/2019 |
| CN | 112399384 | A | 2/2021 |
| CN | 113016158 | A | 6/2021 |
| CN | 113039849 | A | 6/2021 |
| EP | 4096127 | A1 | 11/2022 |
| WO | 2017193380 | A1 | 11/2017 |
| WO | WO-2020221703 | A1 | 11/2020 |
| WO | WO-2020239041 | A1 | 12/2020 |
| WO | WO-2021081983 | A1 | 5/2021 |
| WO | WO-2021159989 | A1 | 8/2021 |

OTHER PUBLICATIONS

Supplementary European Search Report—EP21963623—Search Authority—The Hague—Jul. 4, 2025.

OPPO: "Discussion on Tx Switching Between Two Uplink Carriers", 3GPP TSG RAN WG1 #102-e, R1-2005996, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 28, 2020, 5 Pages.

International Search Report and Written Opinion—PCT/CN2021/130298—ISA/EPO—Mar. 23, 2022.

Moderator (China Telecom): "Summary of Rel-16 Uplink Tx Switching", R1-21xxxxx-v001-hw, 3GPP tsg_ran\wg1_rll, e-Meeting, Jan. 25-Feb. 5, 2021, Apr. 8, 2021 (Apr. 8, 2021), 3 Pages.

* cited by examiner

| | Band Combination A+B+C | Carrier | |
|---|---|---|---|
| 305-a | 1+1+0 | 0+1+0 | 310-a |
| | | 1+0+0 | 310-b |
| 305-b | 0+2+0 | 0+1+0, 0+2+0 | 310-c |
| 305-c | 2+0+0 | 1+0+0, 2+0+0 | 310-d |
| 305-d | 1+0+1 | 0+0+1 | 310-e |
| | | 1+0+0 | 310-f |
| 305-e | 0+1+1 | 0+1+0 | 310-g |
| | | 0+0+1 | 310-h |
| 305-f | 0+0+2 | 0+0+1, 0+0+2 | 310-i |

300-a

FIG. 3A

| | Band Combination A+B+C | Carrier | |
|---|---|---|---|
| 315-a | 1+1+0 | 0+1+0 | 320-a |
| | | 1+0+0 | 320-b |
| 315-b | 0+2+0 | 0+1+0, 0+2+0 | 320-c |
| 315-c | 2+0+0 | 1+0+0, 2+0+0 | 320-d |
| 315-d | 1+0+1 | 0+0+1 | 320-e |
| | | 1+0+0 | 320-f |
| 315-e | 0+1+1 | 0+1+1, 0+1+0, 0+1+1 | 320-g |
| 315-f | 0+0+2 | 0+0+1, 0+0+2 | 320-h |

300-b

FIG. 3B

SUPPLEMENTARY UPLINK SWITCHING FOR SWITCHING MULTIPLE RADIO FREQUENCY BANDS

CROSS REFERENCE

The present Application is a 371 national stage filing of International PCT Application No. PCT/CN2021/130298 by CAO et al. entitled "SUPPLEMENTARY UPLINK SWITCHING FOR SWITCHING MULTIPLE RADIO FREQUENCY BANDS," filed Nov. 12, 2021, which is assigned to the assignee hereof, and which is expressly incorporated by reference in its entirety herein.

FIELD OF TECHNOLOGY

The following relates to wireless communications, including supplementary uplink (SUL) switching for switching multiple radio frequency bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some communication devices may support wireless communication over one or multiple carriers. A carrier may be associated with a radio frequency band of a radio frequency spectrum. Some communication devices may support carrier aggregation for wireless communication. In some cases, these communication devices may support wireless communication over one or multiple radio frequency bands according to the carrier aggregation.

SUMMARY

Various aspects of the present disclosure relate to enabling a communication device (e.g., a UE) to support managing wireless communication (e.g., uplink communication) over multiple radio frequency bands of a radio frequency spectrum. In some cases, when the communication device supports wireless communication over multiple radio frequency bands, scheduling ambiguity may impact the wireless communication between the communication device and a network (e.g., a base station). The scheduling ambiguity may be a result of the communication device being scheduled to switch the wireless communication between subsets of the multiple radio frequency bands. As such, it may be ambiguous as to which radio frequency bands the communication device is to switch to if the network schedules the communication device to switch to multiple radio frequency bands. To eliminate the scheduling ambiguity, the communication device may be configured by the network with a data structure, which may indicate radio frequency bands or radio frequency band combinations for the wireless communication.

For example, the data structure may be a table indicating a radio frequency band or radio frequency bands the communication is to switch to when scheduled to change radio frequency bands. Additionally, the data structure may be based on a capability reported by the communication device to support or not support simultaneous (e.g., at the same time) wireless communication over multiple radio frequency bands. Additionally or alternatively, the communication device may be configured by the network with one or multiple data structures (e.g., tables) indicating the band combinations for the wireless communication for switching radio frequency bands. By configuring the communication device with the data structure indicating the band combinations for the wireless communication for switching the radio frequency bands, the communication device may remove the scheduling ambiguity, and, in some examples, may promote high reliability and low latency wireless communication.

A method for wireless communication a UE is described. The method may include transmitting, to a base station, first control signaling indicating a UE capability for switching between carriers of a group of carriers during uplink communications using carrier aggregation, the group of carriers including three or more carriers that are each associated with different radio frequency bands and include a supplementary uplink (SUL) carrier and at least two NUL carriers, receiving, from the base station and in response to the first control signaling, second control signaling that includes an indication for the UE to switch to a subset of carriers of the group of carriers for transmission of an uplink message, where the subset of carriers is associated with a combination of radio frequency bands, and transmitting the uplink message to the base station on at least one of the subset of carriers in accordance with a mapping between the combination of radio frequency bands and the at least one of the subset of carriers, where the mapping is based on the UE capability.

An apparatus for wireless communication a UE is described. The apparatus may include a processor, memory coupled with the processor, and instructions stored in the memory. The instructions may be executable by the processor to cause the apparatus to transmit, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers, receive, from the base station and in response to the first control signaling, second control signaling that includes an indication for the UE to switch to a subset of carriers of the group of carriers for transmission of an uplink message, where the subset of carriers is associated with a combination of radio frequency bands, and transmit the uplink message to the base station on at least one of the subset of carriers in accordance with a mapping between the combination of radio frequency bands and the at least one of the subset of carriers, where the mapping is based on the UE capability.

Another apparatus for wireless communication a UE is described. The apparatus may include means for transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers, means for receiving, from the base station and in response to the first control signaling, second control signaling that includes an indication for the UE to switch to a subset of carriers of the group of carriers for transmission of an uplink message, where the subset of carriers is associated with a combination of radio frequency bands, and means for transmitting the uplink message to the base station on at least one of the subset of carriers in accordance with a mapping between the combination of radio frequency bands and the at least one of the subset of carriers, where the mapping is based on the UE capability.

A non-transitory computer-readable medium storing code for wireless communication a UE is described. The code may include instructions executable by a processor to transmit, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers, receive, from the base station and in response to the first control signaling, second control signaling that includes an indication for the UE to switch to a subset of carriers of the group of carriers for transmission of an uplink message, where the subset of carriers is associated with a combination of radio frequency bands, and transmit the uplink message to the base station on at least one of the subset of carriers in accordance with a mapping between the combination of radio frequency bands and the at least one of the subset of carriers, where the mapping is based on the UE capability.

In some examples of the method, apparatuses, and non-transitory computer-readable medium described herein, transmitting the first control signaling indicating the UE capability may include operations, features, means, or instructions for transmitting the first control signaling indicating the UE capability to indicate that simultaneous transmission of uplink messages on two or more carriers may be supported by the UE.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the first NUL carrier, the second NUL carrier, or both, for transmission of the uplink message.

In some examples of the method, apparatuses, and non-transitory computer-readable medium described herein, transmitting the first control signaling indicating the UE capability may include operations, features, means, or instructions for transmitting the first control signaling indicating the UE capability to indicate that simultaneous transmission of uplink messages on two or more carriers may be unsupported by the UE.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the first NUL carrier for transmission of the uplink message based on switching from the second NUL carrier or being scheduled to switch to the second NUL carrier to transmit a next uplink message.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the second NUL carrier for transmission of the uplink message based on switching from the first NUL carrier or being scheduled to switch to the first NUL carrier to transmit a next uplink message.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with the SUL carrier and a second radio frequency band associated with an NUL carrier of the at least two NUL carriers, and where the at least one of the subset of carriers includes the NUL carrier for transmission of the uplink message based on switching from the SUL carrier or being scheduled to switch to the SUL carrier to transmit a next uplink message.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with the SUL carrier and a second radio frequency band associated with an NUL carrier of the at least two NUL carriers, and where the at least one of the subset of carriers includes the SUL carrier for transmission of the uplink message based on switching from the NUL carrier or being scheduled to switch to the NUL carrier to transmit a next uplink message.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a radio frequency band associated with an NUL carrier of the at least two NUL carriers, and where the at least one of the subset of carriers includes the NUL carrier for transmission of the uplink message using one antenna port or two antenna ports.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a radio frequency band associated with the SUL carrier, and where the at least one of the subset of carriers includes the SUL carrier for transmission of the uplink message using one antenna port or two antenna ports.

Some examples of the method, apparatuses, and non-transitory computer-readable medium described herein may further include operations, features, means, or instructions for selecting the at least one of the subset of carriers in accordance with the mapping based on a previous subset of carriers of the group of carriers from which the UE may be indicated to switch to the subset of carriers.

Some examples of the method, apparatuses, and non-transitory computer-readable medium described herein may further include operations, features, means, or instructions for selecting the at least one of the subset of carriers in accordance with the mapping based on a next subset of carriers of the group of carriers to which the UE may be scheduled to switch from the subset of carriers.

A method for wireless communication at a base station is described. The method may include receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers, transmitting, to the UE and in response to the first control signaling, second control signaling that includes an indication for the UE to switch to a subset of carriers of the group of carriers for transmission of an uplink message, where the subset of carriers is associated with a combination of radio frequency bands, and receiving the uplink message from the UE on at least one of the subset of carriers in accordance with a mapping between the combination of radio frequency bands and the at least one of the subset of carriers, where the mapping is based on the UE capability.

An apparatus for wireless communication at a base station is described. The apparatus may include a processor, memory coupled with the processor, and instructions stored in the memory. The instructions may be executable by the processor to cause the apparatus to receive, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers, transmit, to the UE and in response to the first control signaling, second control signaling that includes an indication for the UE to switch to a subset of carriers of the group of carriers for transmission of an uplink message, where the subset of carriers is associated with a combination of radio frequency bands, and receive the uplink message from the UE on at least one of the subset of carriers in accordance with a mapping between the combination of radio frequency bands and the at least one of the subset of carriers, where the mapping is based on the UE capability.

Another apparatus for wireless communication at a base station is described. The apparatus may include means for receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers, means for transmitting, to the UE and in response to the first control signaling, second control signaling that includes an indication for the UE to switch to a subset of carriers of the group of carriers for transmission of an uplink message, where the subset of carriers is associated with a combination of radio frequency bands, and means for receiving the uplink message from the UE on at least one of the subset of carriers in accordance with a mapping between the combination of radio frequency bands and the at least one of the subset of carriers, where the mapping is based on the UE capability.

A non-transitory computer-readable medium storing code for wireless communication at a base station is described. The code may include instructions executable by a processor to receive, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers, transmit, to the UE and in response to the first control signaling, second control signaling that includes an indication for the UE to switch to a subset of carriers of the group of carriers for transmission of an uplink message, where the subset of carriers is associated with a combination of radio frequency bands, and receive the uplink message from the UE on at least one of the subset of carriers in accordance with a mapping between the combination of radio frequency bands and the at least one of the subset of carriers, where the mapping is based on the UE capability.

In some examples of the method, apparatuses, and non-transitory computer-readable medium described herein, the UE capability indicates that simultaneous transmission of uplink messages on two or more carriers may be supported by the UE.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the first NUL carrier, the second NUL carrier, or both, for transmission of the uplink message.

In some examples of the method, apparatuses, and non-transitory computer-readable medium described herein, the UE capability indicates that simultaneous transmission of uplink messages on more than one carrier may be unsupported by the UE.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the first NUL carrier for transmission of the uplink message based on switching from the second NUL carrier or being scheduled to switch to the second NUL carrier to transmit a next uplink message.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the second NUL carrier for transmission of the uplink message based on switching from the first NUL carrier or being scheduled to switch to the first NUL carrier to transmit a next uplink message.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with the SUL carrier and a second radio frequency band associated with an NUL carrier of the at least two NUL carriers, and where the at least one of the subset of carriers includes the NUL carrier for transmission of the uplink message based on switching from the SUL carrier or being scheduled to switch to the SUL carrier to transmit a next uplink message.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a first radio frequency band associated with the SUL carrier and a second radio frequency band associated with an NUL carrier of the at least two NUL carriers, and where the at least one of the subset of carriers includes the SUL carrier for transmission of the uplink message based on switching from the NUL carrier or being scheduled to switch to the NUL carrier to transmit a next uplink message.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a radio frequency band associated with an NUL carrier of the at least two NUL carriers, and where the at least one of the subset of carriers includes the NUL carrier for transmission of the uplink message using one antenna port or two antenna ports.

Some examples of the method, apparatuses, and non-transitory computer-readable medium described herein may further include operations, features, means, or instructions for applying the mapping from the combination of radio frequency bands to the at least one of the subset of carriers, where the combination of radio frequency bands includes a radio frequency band associated with the SUL carrier, and where the at least one of the subset of carriers includes the SUL carrier for transmission of the uplink message using one antenna port or two antenna ports.

In some examples of the method, apparatuses, and non-transitory computer-readable medium described herein, the mapping indicates the at least one of the subset of carriers based on a previous subset of carriers of the group of carriers from which the UE may be indicated to switch to the subset of carriers.

In some examples of the method, apparatuses, and non-transitory computer-readable medium described herein, the mapping indicates the at least one of the subset of carriers based on a next subset of carriers of the group of carriers to which the UE may be scheduled to switch from the subset of carriers.

BRIEF DESCRIPTION OF THE DRAWINGS

FIGS. 3A and 3B illustrate example of mappings that support SUL switching for switching multiple radio frequency bands in accordance with aspects of the present disclosure.

DETAILED DESCRIPTION

Figure 1:
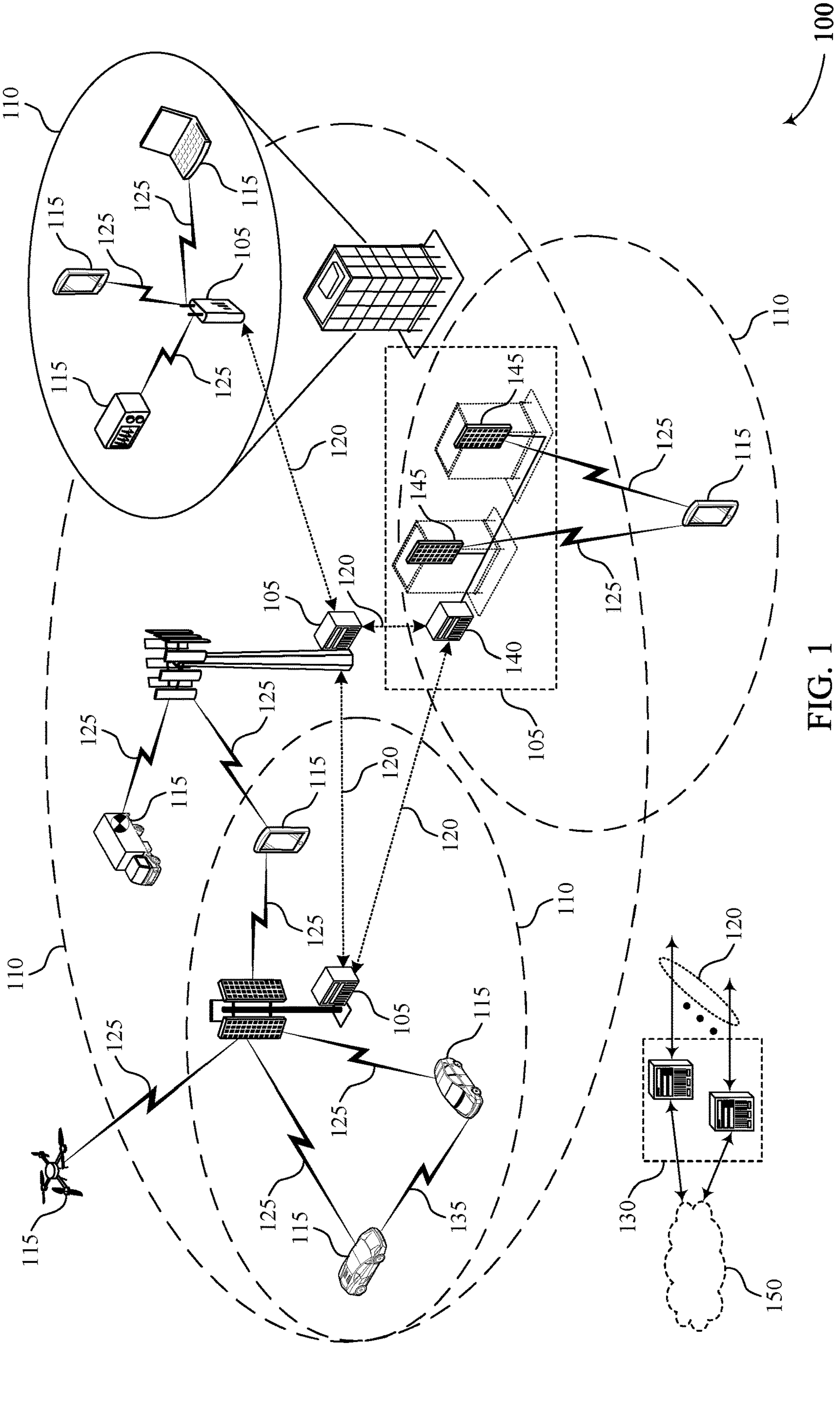
FIGS. 1 and 2 illustrate examples of wireless communications systems that support supplementary uplink (SUL) switching for switching multiple radio frequency bands in accordance with aspects of the present disclosure.

A wireless communications system may include communication devices, such as a UE or a base station (e.g., an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. A communication device may support wireless communication over one or multiple radio frequency bands and one or multiple carriers. For example, the communication device may be configured with a single carrier, or multiple carriers in the form of carrier aggregation or dual connectivity. A network (e.g., a base station) may schedule the communication device with the one or multiple carriers to support the wireless communication. The communication device may also be configured to support carrier aggregation over a single or multiple radio frequency bands (e.g., inter-band carrier aggregation). In some examples, the communication device may support the aggregation of supplementary uplink (SUL) carriers and normal uplink (NUL) carriers, for example, to improve uplink throughput, coverage, and reliability. For example, the communication device may be configured to aggregate an SUL carrier and one or more NUL carriers over multiple radio frequency bands.

The communication device may aggregate two or more carriers in the same radio frequency band or separate radio frequency bands. In some cases, the communication device may be unable to support simultaneous wireless communications (e.g., uplink transmissions) over multiple radio frequency bands. In some other cases, the communication device may be able to support simultaneous wireless communications over multiple radio frequency bands. In some cases, if the communication device supports communicating over three or more radio frequency bands, one of which is associated with communicating an SUL carrier, there may be scheduling ambiguity for the wireless communications between the communication device and the network when the communication device is scheduled to switch operating between subsets of the three or more radio frequency bands. For example, it may be ambiguous as to which one or more radio frequency bands the communication device is to switch if the network schedules the communication device to switch to multiple radio frequency bands (e.g., from a single radio frequency band, from a different combination of the three or more radio frequency bands).

Various aspects of the present disclosure relate to configuring the communication device with a data structure, which may indicate radio frequency bands or radio frequency band combinations for the wireless communication, to eliminate any scheduling ambiguity. The communication device may transmit, to the network, control signaling that may indicate a capability for switching between one or more carriers of a group of carriers during uplink communications using carrier aggregation. The group of carriers may include three or more carriers that are each associated with different radio frequency bands and include an SUL carrier and at least two NUL carriers. Additionally, the capability may indicate the communication device supporting or not supporting wireless communication over multiple carriers or radio frequency bands. The data structure may thus be based on the capability reported by the communication device of whether the communication devices supports simultaneous wireless communication over multiple radio frequency bands.

In some examples, the data structure may be a mapping table indicating a radio frequency band or radio frequency bands that the communication device is to switch to when scheduled to change radio frequency bands. In some examples, the mapping table may be pre-configured at the communication device. In some examples, the network may configure or indicate the mapping table to the communication device via control signaling. Examples of the control signaling include a radio resource control (RRC) message, a medium access control-control element (MAC-CE), or downlink control information (DCI). Additionally or alternatively, the communication device may be pre-configured with or configured by the network with one or multiple data structures (e.g., mapping tables) indicating the band combinations for the wireless communication for switching radio frequency bands. For example, the communication device may be pre-configured or configured with one mapping table if the communication device does not support simultaneous wireless communication, and a different mapping table if the communication device does support such simultaneous wireless communication. The network and the communication device may then communicate in accordance with at least one of the mapping tables based on the reported capability by the communication device.

By implementing the data structure indicating the band combinations for the wireless communication for switching the radio frequency bands, the communication device may remove the scheduling ambiguity, and, in some examples, may promote high reliability and low latency wireless communication. The communication device may also manage resource utilization by managing wireless communication over multiple carriers when switching radio frequency bands. Additionally, the communication device may reduce power consumption by managing the wireless communication over multiple carriers when switching radio frequency bands.

Aspects of the disclosure are initially described in the context of wireless communications systems. Aspects of the disclosure are additionally described in the context of mappings and a process flow. Aspects of the disclosure are further illustrated by and described with reference to apparatus diagrams, system diagrams, and flowcharts that relate to SUL switching for switching multiple radio frequency bands.

FIG. 1 illustrates an example of a wireless communications system 100 that supports SUL switching for switching multiple radio frequency bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may support carrier aggregation, in which the UE 115 may transmit or receive wireless communications (e.g., uplink signals, downlink signals) on two or more aggregated carriers. Each aggregated carrier be of different bandwidths. The carrier may have a bandwidth of 1.4, 3, 5, 10, 15 or 20 MHz and, in some cases, a maximum number of carriers may be aggregated. For example, the maximum number of carriers for carrier aggregation may be five carriers, and thus the maximum aggregated bandwidth may be 100 MHz. The UE 115 may be configured or allocated contiguous carriers within the same radio frequency band, also referred to as intra-band contiguous, for carrier aggregation. In some cases, intra-band contiguous carrier aggregation may not be possible. For non-contiguous carrier aggregation allocation it could either be intra-band (e.g., the carriers belong to the same radio frequency band, but have a gap, or gaps, in between), or it could be inter-band, in which case the carriers belong to different radio frequency bands.

The UE 115 may be configured to support wireless communication over NUL carriers and SUL carriers. For example, in some cases, a coverage associated with an NUL carrier may decrease as a carrier frequency of the NUL carrier increases. In some examples, the base station 105 may configure the UE 115 with an SUL carrier (e.g., having a lower carrier frequency than the NUL carrier) in order to increase coverage. In some cases, a numerology for the NUL carrier may be the same as or different from a numerology for the SUL carrier. In some examples, the NUL carrier and the SUL carrier may be configured for physical random access channel (PRACH) transmissions, sounding reference signal (SRS) transmissions, physical uplink shared channel (PUSCH) transmissions, physical uplink control channel (PUCCH) transmissions, or a combination thereof, among other transmissions.

A base station 105 may schedule the UE 115 with one or multiple carriers for wireless communication (e.g., one SUL carrier and one or more NUL carriers). The UE 115 may also be configured to support carrier aggregation over a single or multiple radio frequency bands (e.g., inter-band carrier aggregation). In some cases, the UE 115 may be unable to support simultaneous wireless communication (e.g., uplink transmission) over multiple radio frequency bands. In some other cases, the UE 115 may be able to support simultaneous wireless communications over multiple radio frequency bands. In some cases, if the UE 115 supports communicating over multiple radio frequency bands (e.g., three or more radio frequency bands, one of which is associated with communicating an SUL carrier) there may be scheduling ambiguity for the wireless communications between the base station 105 and the UE 115 when the UE 115 is scheduled to switch operating between a subset of the multiple radio frequency bands (e.g., the three or more radio frequency bands). In other words, the UE 115 may be scheduled to switch uplink transmissions on one or more radio frequency bands.

In the wireless communications system 100, a base station 105 and a UE 115 may implement a table, which may indicate a mapping between radio frequency band combinations and carrier usage for wireless communication, to eliminate any scheduling ambiguity. In the wireless communications system 100, a UE 115 may transmit, and the base station 105 may receive, first control signaling (e.g., a radio resource control (RRC) message, in a system information message, or the like) indicating a UE capability for switching between one or more carriers of a group of carriers for uplink communications. The group of carriers may include three or more carriers that are each associated with different radio frequency bands and include an SUL carrier and at least two NUL carriers. The base station 105 may transmit, and the UE 115 may receive, second control signaling such as an RRC message, or a DCI, or a MAC-CE that includes an indication for the UE 115 to switch to a subset of carriers of the group of carriers associated with a combination of radio frequency bands for transmission of an uplink message. The UE 115 may transmit, and the base station 105 may receive, the uplink message on at least one of the subset of carriers in accordance with the mapping (e.g., indicated by the table). By implementing the mapping to indicate radio frequency bands or radio frequency band combinations for wireless communication, the base station 105 and the UE 115 may eliminate any scheduling ambiguity between the base station 105 and the UE 115

Figure 2:
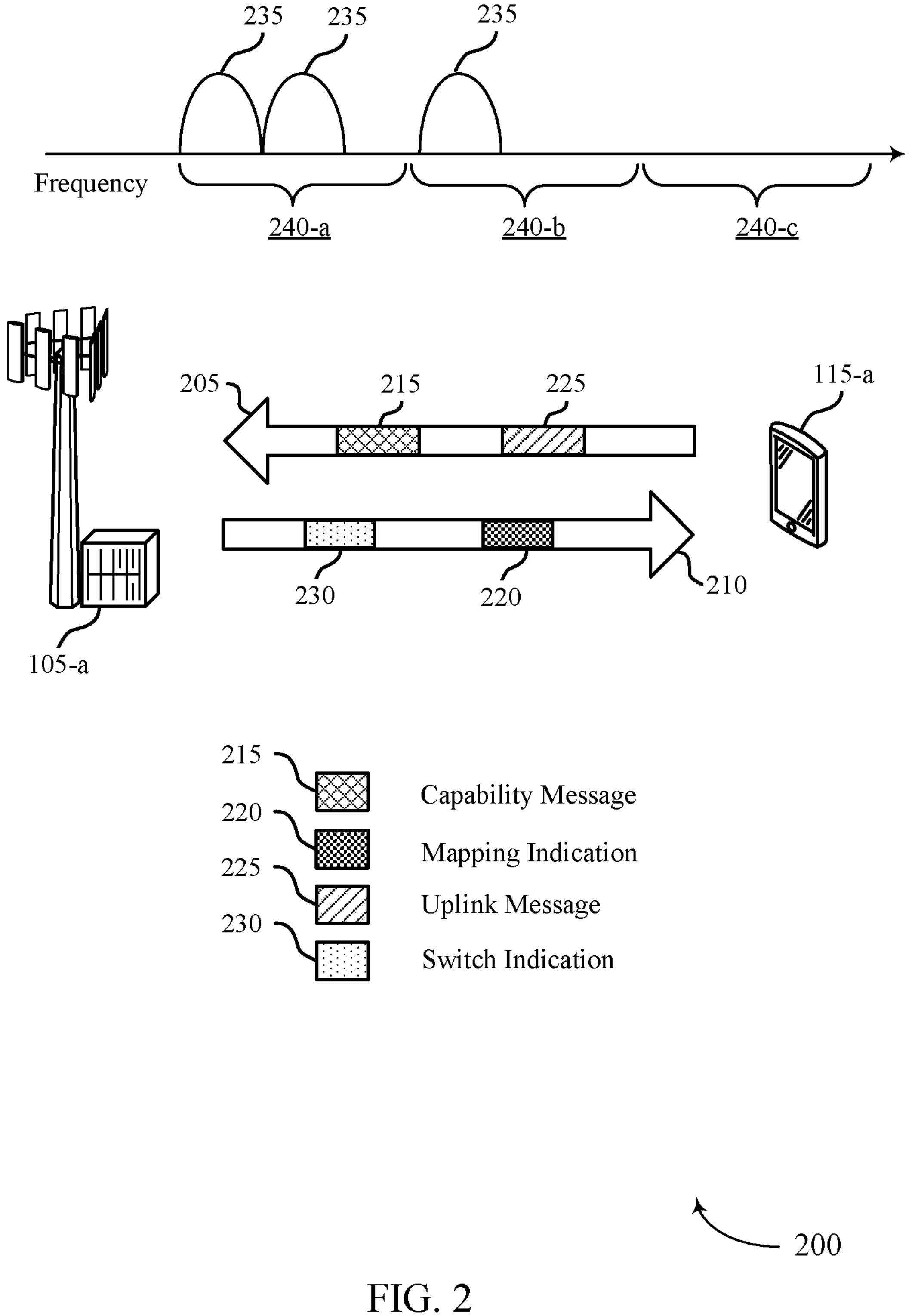

FIG. 2 illustrates an example of a wireless communications system 200 that supports SUL switching for switching multiple radio frequency bands in accordance with aspects of the present disclosure. The wireless communications system 200 may implement or be implemented by one or more aspects of the wireless communications system 100. For example, the wireless communications system 200 may include a base station 105-*a* and a UE 115-*a*, which may be examples of a base station 105 and a UE 115 as described with reference to FIG. 1. The base station 105-*a* and the UE 115-*a* may communicate over a communication link 205 and a communication link 210, which may be examples of communication links 125 as described with reference to FIG. 1.

One or both of the base station 105-*a* or the UE 115-*a* may be configured with multiple antennas. The antennas of one or both of the base station 105-*a* or the UE 115-*a* may be located within one or more antenna arrays or antenna panels, which may support transmit or receive wireless communication. The base station 105-*a* may have one or more antenna arrays with a number of rows and columns of antenna ports that the base station 105-*a* may use to support wireless communication with the UE 115-*a*. Likewise, the UE 115-*a* may have one or more antenna arrays with a number of rows and columns of antenna ports that the UE 115-*a* may use to support wireless communication with the base station 105-*a*. One or both of the base station 105-*a* or the UE 115-*a* may thus be configured to support wireless communication using one or multiple antennas. In some examples, one or both of the base station 105-*a* or the UE 115-*a* may be configured to support operations to manage or improve wireless communication between the base station 105-*a* and the UE 115-*a*.

In some examples, one or both of the base station 105-*a* or the UE 115-*a* may support carrier aggregation, in which one or both of the base station 105-*a* or the UE 115-*a* may transmit or receive wireless communications (e.g., uplink signals, downlink signals) on two or more aggregated carriers. For example, one or both of the base station 105-*a* or the UE 115-*a* may aggregate at least two carriers 235. In some examples, a carrier 235 may be an example of an SUL carrier or an NUL carrier. In some cases, the UE 115-*a* may be configured or allocated contiguous carriers within the same radio frequency band 240, also referred to as intra-band contiguous. For example, one or both of the base station 105-*a* or the UE 115-*a* may aggregate at least two carriers 235 within a radio frequency band 240-*a*. In some cases, intra-band contiguous carrier aggregation may not be possible. For non-contiguous carrier aggregation allocation it could either be intra-band (e.g., the carriers belong to the same radio frequency band, but have a gap, or gaps, in between), or it could be inter-band, in which case the carriers 235 belong to different radio frequency bands 240. For example, one or both of the base station 105-*a* or the UE 115-*a* may aggregate one or more carriers 235 within the radio frequency band 240-*a* and one or more carriers 235 with the radio frequency band 240-*b*.

In some cases, the UE 115-*a* may be unable to support simultaneous wireless communications (e.g., uplink transmissions) over multiple radio frequency bands 240. In some other cases, the UE 115-*a* may be able to support simultaneous wireless communications over multiple radio frequency bands 240. In some cases, if the UE 115-*a* supports communicating over three or more radio frequency bands 240, such as the radio frequency band 240-*a*, the radio frequency band 240-*b*, and a radio frequency band 240-*c*, there may be scheduling ambiguity for the wireless communications between the base station 105-*a* and the UE 115-*a* when the UE 115-*a* is scheduled to switch operating between subsets of the three or more radio frequency bands 240. For example, it may be ambiguous as to which one or more radio frequency bands 240 the UE 115-*a* is to switch if the base station 105-*a* schedules the UE 115-*a* to switch to multiple radio frequency bands 240. Additional scheduling ambiguity may be introduced if one of the three or more radio frequency bands 240 is associated with communication an SUL carrier. For example, in some cases, the UE 115 may be limited to communicating on an SUL carrier or an NUL carrier even if the UE 115 supports simultaneous communications on multiple radio frequency bands 240. Accordingly, it may be ambiguous as to which radio frequency band 240 the UE 115-*a* is to switch if the base station 105-*a* schedules the UE 115-*a* to switch to both a radio frequency band 240 associated with communicating an SUL carrier and a radio frequency band 240 associated with communicating an NUL carrier.

In the example of FIG. 2, the UE 115-*a* may transmit, and the base station 105-*a* may receive, a capability message 215 that may indicate a capability of the UE 115-*a* for switching between one or more carriers 235 of a group of carriers during uplink communications using carrier aggregation. The group of carriers may include three or more carriers 235 that are each associated with different radio frequency bands 240 and include an SUL carrier and at least two NUL carriers. Additionally, the capability message 215 may indicate whether the UE 115-*a* supports or does not support simultaneous wireless communication over multiple carriers 235 or radio frequency bands 240. Based on the capability message 215, the base station 105-*a* and the UE 115-*a* may implement a data structure. In some examples, the data structure may be pre-configured at the base station 105-*a* and the UE 115-*a*. In some other examples, the base station 105-*a* may transmit, and the UE 115-*a* may receive, a mapping indication 220, which may include the data structure that is based on whether the UE 115-*a* supports or does not support the simultaneous wireless communication. In some examples, the base station 105-*a* may transmit the mapping indication 220 in control signaling, such as an RRC message, a MAC-CE, or DCI.

The data structure may be a mapping table indicating a radio frequency band 240 or radio frequency bands 240 that the UE 115-*a* is to switch to when scheduled to change radio frequency bands 240 for transmission of an uplink message 225. In some examples, the base station 105-*a* may transmit, and the UE 115-*a* may receive, a switch indication 230 for the UE 115-*a* to switch to a subset of carriers 235 of the group of carriers associated with a combination of radio frequency bands 240 for transmission of the uplink message 225. The UE 115-*a* may then transmit the uplink message 225 to the base station 105-*a* on at least one of the subset of carriers 235 in accordance with a mapping between the combination of radio frequency bands 240 and the at least one of the subset of carriers 235 included in the mapping table.

By implementing the data structure (e.g., the mapping table) to indicate radio frequency bands 240 or combinations of radio frequency bands 240 for wireless communication, the UE 115-*a* and the base station 105-*a* may eliminate any scheduling ambiguity between the base station 105-*a* and the UE 115-*a*. Examples of mapping tables will be discussed in further detail with reference to FIGS. 3A and 3B. Additionally, by implementing the data structure to indicate radio frequency bands 240 or combinations of radio frequency bands 240 for wireless communication, the UE 115-*a* and the base station 105-*a* may mitigate any conflict scheduling for any radio frequency band combinations.

FIG. 3 illustrates an example of a mapping 300-*a* that supports SUL switching for switching multiple radio frequency bands in accordance with aspects of the present disclosure. The mapping 300-*a* may implement or be implemented by aspects of the wireless communications systems 100 and 200 as described with reference to FIGS. 1 and 2, respectively. For example, the mapping 300-*a* may be implemented by a UE 115 and a base station 105 to reduce or eliminate scheduling ambiguity associated with switching between radio frequency bands and carriers during uplink communications, among other benefits.

The mapping 300-*a* may be an example of a data structure, such as a mapping between radio frequency band combinations and carriers, that may be implemented by a UE 115 that does not support the simultaneous transmission of uplink messages on two or more carriers across two or more associated radio frequency bands (e.g., that supports the transmission of uplink messages over a single radio frequency band at a time). Additionally, the mapping 300-*a* may be implemented by a base station 105 that communicates with the UE 115 that does not support the simultaneous transmission of uplink messages on two or more carriers (e.g., as reported by the UE 115 via a capability message 215 described with reference to FIG. 2).

The mapping 300-*a* may enable the UE 115 and the base station 105 to determine on which carriers to communicate uplink messages when the UE 115 supports communicating with the base station 105 on three or more radio frequency bands. In the example of FIG. 3A, the mapping 300-*a* may include entries 305 corresponding to various combinations of three radio frequency bands, band A, band B, and band C, with which the UE 115 and the base station 105 may be configured for communicating uplink messages. Band A may be associated with communicating SUL carriers, and band B and band C may be associated with communicating NUL carriers. It is noted that the techniques described herein may be adapted and applied to mappings 300 associated with combinations of more than three radio frequency bands.

Each entry 305 may correspond to a different combination of radio frequency bands A, B, or C to which the base station 105 may schedule the UE 115 to switch to transmit an uplink message. For example, the entry 305-*a* may correspond to a combination of bands A and B, the entry 305-*b* may correspond to band B, the entry 305-*c* may correspond to band A, the entry 305-*d* may correspond to a combination of bands A and C, the entry 305-*e* may correspond to a combination of bands B and C, and the entry 305-*f* may correspond to band C. In some examples, the entries 305 may indicate a quantity of carriers or antenna ports associated with a given radio frequency band combination. In the example of FIG. 3A, the entry 305-*a* may correspond to a scheduled switch to an SUL carrier on band A and an NUL carrier on band B; the entry 305-*b* may correspond to a scheduled switch to one or two NUL carriers on band B; the entry 305-*c* may correspond to a scheduled switch to one or two SUL carriers on band A; the entry 305-*d* may correspond to a scheduled switch to an SUL carrier on band A and an NUL carrier on band C; the entry 305-*e* may correspond to a scheduled switch to an NUL carrier on band B and an NUL carrier on band C; and the entry 305-*f* may correspond to a scheduled switch to one or two NUL carriers on band C.

The mapping 300-*a* may map each entry 305 to an entry 310 that indicates on which carrier(s) the UE 115 is to transmit the uplink message (e.g., and using which antenna ports). For example, the entry 305-*a* may map to an entry 310-*a* indicating for the UE 115 to transmit the uplink message on the NUL carrier on band B and using a first antenna port. The entry 305-*a* may also map to an entry 310-*b* indicating for the UE 115 to transmit the uplink message on the SUL carrier on band A and using a second antenna port. The entry 305-*b* may map to an entry 310-*c* indicating for the UE 115 to transmit the uplink message on the one or two NUL carriers on band B using one or two antenna ports. The entry 305-*c* may map to an entry 310-*d* indicating for the UE 115 to transmit the uplink message on the one or two SUL carriers on band A using one or two antenna ports. The entry 305-*d* may map to an entry 310-*e* indicating for the UE 115 to transmit the uplink message on the NUL carrier on band C and using a first antenna port. The entry 305-*d* may also map to an entry 310-*f* indicating for the UE 115 to transmit the uplink message on the SUL carrier on band A and using a second antenna port. The entry 305-*e* may map to an entry 310-*g* indicating for the UE 115 to transmit the uplink message on the NUL carrier on band B and using a first antenna port. The entry 305-*e* may also map to an entry 310-*h* indicating for the UE 115 to transmit the uplink message on the NUL carrier on band C and using a second antenna port. The entry 305-*f* may map to an entry 310-*i* indicating for the UE 115 to transmit the uplink message on the one or two NUL carriers on band C using one or two antenna ports. Based on the UE 115 not supporting simultaneous transmissions over two or more radio frequency bands, the entries 310 may indicate one radio frequency band of the combination of radio frequency bands associated with a corresponding entry 305 on which to transmit the uplink message.

In some examples, the mapping from an entry 305 to an entry 310 may be based on a previous radio frequency band combination or set of carriers from which the UE 115 is scheduled to switch. In some examples, the mapping from an entry 305 to an entry 310 may be based on a next radio frequency band combination or set of carriers to which the UE 115 is scheduled to switch. For example, if the UE 115 is scheduled to switch to bands A and B corresponding to the entry 305-*a*, the mapping 300-*a* may map the entry 305-*a* to the entry 310-*a* if the UE 115 is scheduled to switch from band A corresponding to the entry 305-*c* or switch to band A after the switch to bands A and B. Here, the UE 115 may apply the mapping 300-*a* to select the NUL carrier on band B to transmit the uplink message, and the base station 105 may apply the mapping 300-*a* to determine to receive the uplink message on the NUL carrier on band B. Alternatively, the mapping 300-*a* may map the entry 305-*a* to the entry 310-*b* if the UE 115 is scheduled to switch from band C corresponding to the entry 305-*f* or switch to band C after the switch to bands A and B. Here, the UE 115 may apply the mapping 300-*a* to select the SUL carrier on band A to transmit the uplink message, and the base station 105 may apply the mapping 300-*a* to determine to receive the uplink message on the SUL carrier on band A.

Additionally, or alternatively, if the UE 115 is scheduled to switch to bands A and C corresponding to the entry 305-*d*, the mapping 300-*a* may map the entry 305-*d* to the entry 310-*e* if the UE 115 is scheduled to switch from band A corresponding to the entry 305-*c* or switch to band C after the switch to bands A and C. Here, the UE 115 may apply the mapping 300-*a* to select the NUL carrier on band C to transmit the uplink message, and the base station 105 may apply the mapping 300-*a* to determine to receive the uplink message on the NUL carrier on band C. Alternatively, the mapping 300-*a* may map the entry 305-*d* to the entry 310-*f* if the UE 115 is scheduled to switch from band C corresponding to the entry 305-*f* or switch to band C after the switch to bands A and C. Here, the UE 115 may apply the mapping 300-*a* to select the SUL carrier on band A to transmit the uplink message, and the base station 105 may apply the mapping 300-*a* to determine to receive the uplink message on the SUL carrier on band A.

Additionally, or alternatively, if the UE 115 is scheduled to switch to bands B and C corresponding to the entry 305-*e*, the mapping 300-*a* may map the entry 305-*e* to the entry 310-*g* if the UE 115 is scheduled to switch from band C corresponding to the entry 305-*f* or switch to band C after the switch to bands B and C. Here, the UE 115 may apply the mapping 300-*a* to select the NUL carrier on band B to transmit the uplink message, and the base station 105 may apply the mapping 300-*a* to determine to receive the uplink message on the NUL carrier on band B. Alternatively, the mapping 300-*a* may map the entry 305-*e* to the entry 310-*h* if the UE 115 is scheduled to switch from band B corresponding to the entry 305-*b* or switch to band B after the switch to bands B and C. Here, the UE 115 may apply the mapping 300-*a* to select the NUL carrier on band C to transmit the uplink message, and the base station 105 may apply the mapping 300-*a* to determine to receive the uplink message on the NUL carrier on band C.

It is noted that any other mapping based on previous or next radio frequency band combinations is possible. For example, the mapping 300-*a* may map the entry 305-*a* to the entry 310-*b* if the UE 115 is scheduled to switch from band B corresponding to the entry 305-*b* or switch to band B after the switch to bands A and B.

In some examples, the UE 115 may select one or more carriers and one or more antenna ports indicated by an entry 310 for transmitting the uplink message based on a quantity of antenna ports that the UE 115 is scheduled to use. For example, if the UE 115 is scheduled to switch to band B corresponding to the entry 305-*b*, the UE 115 may apply the mapping 300-*a* to determine the entry 310-*c*. The UE 115 may select to transmit the uplink message on one NUL carrier on band B using one antenna port if the UE 115 is scheduled to use the one antenna port, or the UE 115 may select to transmit the uplink message on two NUL carriers on band B using two antenna ports if the UE is scheduled to use the two antenna ports. Similarly, the base station 105 may apply the mapping 300-*a* to determine whether to receive the uplink message on the one NUL carrier on band B or the two NUL carriers on band B.

Additionally, or alternatively, if the UE 115 is scheduled to switch to band A corresponding to the entry 305-*c*, the UE 115 may apply the mapping 300-*a* to determine the entry 310-*d*. The UE 115 may select to transmit the uplink message on one SUL carrier on band A using one antenna port if the UE 115 is scheduled to use the one antenna port, or the UE 115 may select to transmit the uplink message on two SUL carriers on band A using two antenna ports if the UE is scheduled to use the two antenna ports. Similarly, the base station 105 may apply the mapping 300-*a* to determine whether to receive the uplink message on the one SUL carrier on band A or the two SUL carriers on band A.

Additionally, or alternatively, if the UE 115 is scheduled to switch to band C corresponding to the entry 305-*f*, the UE 115 may apply the mapping 300-*a* to determine the entry 310-*i*. The UE 115 may select to transmit the uplink message on one NUL carrier on band C using one antenna port if the UE 115 is scheduled to use the one antenna port, or the UE 115 may select to transmit the uplink message on two NUL carriers on band C using two antenna ports if the UE is scheduled to use the two antenna ports. Similarly, the base station 105 may apply the mapping 300-*a* to determine whether to receive the uplink message on the one NUL carrier on band C or the two NUL carriers on band C.

In this way, the UE 115 and the base station 105 may implement the mapping 300-*a* (e.g., if the UE 115 indicates that it does not support simultaneous transmissions on multiple radio frequency bands) to remove scheduling ambiguity between the UE 115 and the base station 105.

FIG. 3B illustrates an example of a mapping 300-*b* that supports SUL switching for switching multiple radio frequency bands in accordance with aspects of the present disclosure. The mapping 300-*b* may implement or be implemented by aspects of the wireless communications systems 100 and 200 as described with reference to FIGS. 1 and 2, respectively. For example, the mapping 300-*b* may be implemented by a UE 115 and a base station 105 to reduce or eliminate scheduling ambiguity associated with switching between radio frequency bands and carriers during uplink communications, among other benefits.

The mapping 300-*b* may be an example of a data structure, such as a mapping between radio frequency band combinations and carriers, that may be implemented by a UE 115 that supports the simultaneous transmission of uplink messages on two or more carriers across two or more associated radio frequency bands. Additionally, the mapping 300-*b* may be implemented by a base station 105 that communicates with the UE 115 that supports the simultaneous transmission of uplink messages on two or more carriers (e.g., as reported by the UE 115 via a capability message 215 described with reference to FIG. 2).

The mapping 300-*b* may enable the UE 115 and the base station 105 to determine on which carriers to communicate uplink messages when the UE 115 supports communicating with the base station 105 on three or more radio frequency bands. For example, the mapping 300-*b* may include entries 315 corresponding to different combinations of radio frequency bands over which the base station 105 may schedule the UE 115 to transmit an uplink message. In the example of FIG. 3B, the mapping 300-*b* may include entries 315 corresponding to various combinations of three radio frequency bands, band A, band B, and band C, with which the UE 115 and the base station 105 may be configured for communicating uplink messages. Band A may be associated with communicating SUL carriers, and band B and band C may be associated with communicating NUL carriers. It is noted that the techniques described herein may be adapted and applied to mappings 300 associated with combinations of more than three radio frequency bands.

Each entry 315 may correspond to a different combination of radio frequency bands A, B, or C to which the base station 105 may schedule the UE 115 to switch to transmit an uplink message. For example, the entry 315-*a* may correspond to a combination of bands A and B, the entry 315-*b* may correspond to band B, the entry 315-*c* may correspond to band A, the entry 315-*d* may correspond to a combination of bands A and C, the entry 315-*e* may correspond to a combination of bands B and C, and the entry 315-*f* may correspond to band C. In some examples, the entries 315 may indicate a quantity of carriers or antenna ports associated with a given radio frequency band combination. In the example of FIG. 3B, the entry 315-*a* may correspond to a scheduled switch to an SUL carrier on band A and an NUL carrier on band B; the entry 315-*b* may correspond to a scheduled switch to one or two NUL carriers on band B; the entry 315-*c* may correspond to a scheduled switch to one or two SUL carriers on band A; the entry 315-*d* may correspond to a scheduled switch to an SUL carrier on band A and an NUL carrier on band C; the entry 315-*e* may correspond to a scheduled switch to an NUL carrier on band B and an NUL carrier on band C; and the entry 315-*f* may correspond to a scheduled switch to one or two NUL carriers on band C.

The mapping 300-*b* may map each entry 315 to an entry 320 that indicates on which carrier(s) the UE 115 is to transmit the uplink message (e.g., and using which antenna ports). For example, the entry 315-*a* may map to an entry 320-*a* indicating for the UE 115 to transmit the uplink message on the NUL carrier on band B and using a first antenna port. The entry 315-*a* may also map to an entry 320-*b* indicating for the UE 115 to transmit the uplink message on the SUL carrier on band A and using a second antenna port. The entry 315-*b* may map to an entry 320-*c* indicating for the UE 115 to transmit the uplink message on the one or two NUL carriers on band B using one or two antenna ports. The entry 315-*c* may map to an entry 320-*d* indicating for the UE 115 to transmit the uplink message on the one or two SUL carriers on band A using one or two antenna ports. The entry 315-*d* may map to an entry 320-*e* indicating for the UE 115 to transmit the uplink message on the NUL carrier on band C and using a first antenna port. The entry 315-*d* may also map to an entry 320-*f* indicating for the UE 115 to transmit the uplink message on the SUL carrier on band A and using a second antenna port. The entry 315-*e* may map to an entry 320-*g* indicating for the UE 115 to transmit the uplink message on the NUL carrier on band B and using a first antenna port, the NUL carrier on band C using a second antenna port, or both. The entry 315-*f* may map to an entry 320-*h* indicating for the UE 115 to transmit the uplink message on the one or two NUL carriers on band C using one or two antenna ports.

Based on the UE 115 supporting simultaneous transmissions on multiple radio frequency bands, the entries 320 may indicate one or more radio frequency bands of the combination of radio frequency bands associated with a corresponding entry 315 on which to transmit the uplink message. In some examples, the entries may indicate the one or more radio frequency bands based on whether the UE 115 is scheduled to switch to a combination of radio frequency bands including a radio frequency band associated with transmitting SUL carriers (e.g., band A). For example, the UE 115 may be limited to transmitting uplink messages on an SUL carrier or an NUL carrier even if the UE 115 supports simultaneous transmission on multiple radio frequency bands. As such, the entries 320 corresponding to the entry 315-*a* and the entry 315-*d*, which correspond to a combination of radio frequency bands that includes band A, may indicate for the UE 115 to switch to either band A or a radio frequency band associated with an NUL carrier (e.g., band B or band C) despite the UE 115 supporting simultaneous transmissions on multiple radio frequency bands. Additionally, the entry 315-*e* may indicate for the UE 115 to switch to one or both of band B and C based on supporting simultaneous transmissions on multiple radio frequency bands.

In some examples, the mapping the mapping from an entry 315 to an entry 320 may be based on a previous radio frequency band combination or set of carriers from which the UE 115 is scheduled to switch or on a next radio frequency band combination or set of carriers to which the UE 115 is scheduled to switch, or both. For example, the mapping 300-*b* may map the entry 315-*a* to the entry 320-*a* if the UE 115 is scheduled to switch from band A corresponding to the entry 315-*c* or switch to band A after the switch to bands A and B. Here, the UE 115 may apply the mapping 300-*b* to select the NUL carrier on band B to transmit the uplink message, and the base station 105 may apply the mapping 300-*b* to determine to receive the uplink message on the NUL carrier on band B. Alternatively, the mapping 300-*b* may map the entry 315-*a* to the entry 320-*b* if the UE 115 is scheduled to switch from band C corresponding to the entry 315-*f* or switch to band C after the switch to bands A and B. Here, the UE 115 may apply the mapping 300-*b* to select the SUL carrier on band A to transmit the uplink message, and the base station 105 may apply the mapping 300-*b* to determine to receive the uplink message on the SUL carrier on band A.

Additionally, or alternatively, the mapping 300-*b* may map the entry 315-*d* to the entry 320-*e* if the UE 115 is scheduled to switch from band A corresponding to the entry 315-*c* or switch to band A after the switch to bands A and C. Here, the UE 115 may apply the mapping 300-*b* to select the NUL carrier on band C to transmit the uplink message, and the base station 105 may apply the mapping 300-*b* to determine to receive the uplink message on the NUL carrier on band C. Alternatively, the mapping 300-*b* may map the entry 315-*d* to the entry 320-*f* if the UE 115 is scheduled to switch from band C corresponding to the entry 315-*f* or switch to band C after the switch to bands A and C. Here, the UE 115 may apply the mapping 300-*b* to select the SUL carrier on band A to transmit the uplink message, and the base station 105 may apply the mapping 300-*b* to determine to receive the uplink message on the SUL carrier on band A.

It is noted that any other mapping based on previous or next radio frequency band combinations is possible. For example, the mapping 300-*b* may map the entry 315-*a* to the entry 320-*b* if the UE 115 is scheduled to switch from band B corresponding to the entry 305-*b* or switch to band B after the switch to bands A and B.

In some examples, the UE 115 may select one or more carriers and one or more antenna ports indicated by an entry 320 for transmitting the uplink message based on a quantity of antenna ports that the UE 115 is scheduled to use. For example, if the UE 115 is scheduled to switch to band B corresponding to the entry 315-*b*, the UE 115 may apply the mapping 300-*b* to determine the entry 320-*c*. The UE 115 may select to transmit the uplink message on one NUL carrier on band B using one antenna port or on two NUL carriers on band B using two antenna ports based on whether the UE 115 is scheduled to use the one antenna port or the two antenna ports, respectively. Similarly, the base station 105 may apply the mapping 300-*b* to determine whether to receive the uplink message on the one NUL carrier on band B or the two NUL carriers on band B.

Additionally, or alternatively, if the UE 115 is scheduled to switch to band A corresponding to the entry 305-*c*, the UE 115 may apply the mapping 300-*b* to determine the entry 320-*d*. The UE 115 may select to transmit the uplink message on one SUL carrier on band A using one antenna port or on two SUL carriers on band A using two antenna ports based on whether the UE is scheduled to use the one antenna port or the two antenna ports, respectively. Similarly, the base station 105 may apply the mapping 300-*a* to determine whether to receive the uplink message on the one SUL carrier on band A or the two SUL carriers on band A.

Additionally, or alternatively, if the UE 115 is scheduled to switch to bands B and C corresponding to the entry 315-*e*, the UE 115 may apply the mapping 300-*b* to determine the entry 320-*g*. The UE 115 may select to transmit the uplink message on one NUL carrier on band B using the first antenna port, one NUL carrier on band C using the second antenna port, or both, based on whether the UE 115 is scheduled to use the first antenna port, the second antenna port, or both. Similarly, the base station 105 may apply the mapping 300-*b* to determine whether to receive the uplink message on the one NUL carrier on band B, the one NUL carrier on band C, or both.

Additionally, or alternatively, if the UE 115 is scheduled to switch to band C corresponding to the entry 315-*f*, the UE 115 may apply the mapping 300-*b* to determine the entry 320-*h*. The UE 115 may select to transmit the uplink message on one NUL carrier on band C using one antenna port or on two NUL carriers on band C using two antenna ports based on whether the UE 115 is scheduled to use the one antenna port or the two antenna ports. Similarly, the base station 105 may apply the mapping 300-*b* to determine whether to receive the uplink message on the one NUL carrier on band C or the two NUL carriers on band C.

In this way, the UE 115 and the base station 105 may implement the mapping 300-*b* (e.g., if the UE 115 indicates that it supports simultaneous transmissions on multiple radio frequency bands) to remove scheduling ambiguity between the UE 115 and the base station 105.

Figure 4:
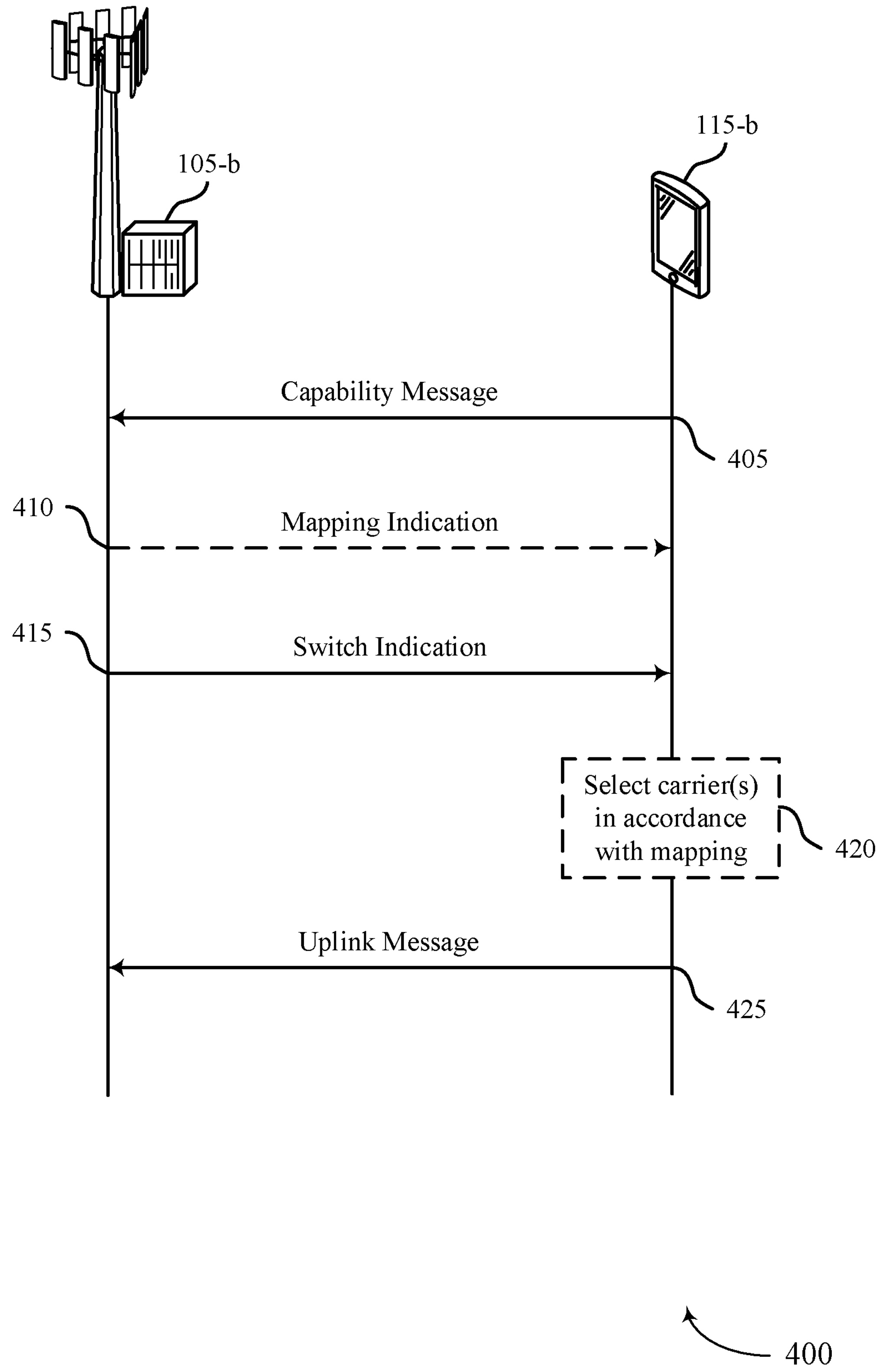
FIG. 4 illustrates an example of a process flow that supports SUL switching for switching multiple radio frequency bands in accordance with aspects of the present disclosure.

FIG. 4 illustrates an example of a process flow 400 that supports SUL switching for switching multiple radio frequency bands in accordance with aspects of the present disclosure. The process flow 400 may implement or be implemented by one or more aspects of the wireless communications system 100 or the wireless communications system 200. For example, the process flow 400 may correspond to communications between a base station 105-*b* and a UE 115-*b*, which may be examples of a base station 105 and a UE 115 as described with reference to FIGS. 1 and 2. In the following description of the process flow 400, operations between the base station 105-*b* and the UE 115-*b* may occur in a different order or at different times than as shown. Some operations may also be omitted from the process flow 400, and other operations may be added to the process flow 400.

At 405, the UE 115-*b* may transmit a capability message to the base station 105-*b* that indicates a capability of the UE 115-*b* for switching between carriers of a group of carriers during uplink communications using carrier aggregation. The group of carriers may include three or more carriers that are each associated with different radio frequency bands. The three or more carriers may include an SUL carrier and at least two NUL carriers. In some examples, the capability message may indicate that the UE 115-*b* supports the simultaneous transmission of uplink messages on two or more carriers (e.g., over two or more radio frequency bands). In some other examples, the capability message may indicate the UE 115-*b* does not support the simultaneous transmission of uplink messages on two or more carriers over two or more radio frequency bands (e.g., that the UE 115-*b* supports transmitting on a single radio frequency band at a time). In some examples, the UE 115-*b* may transmit the capability message in control signaling such as an RRC message, a MAC-CE, or uplink control information (UCI).

At 410, the base station 105-*b* may transmit a mapping indication to the UE 115-*b*. The mapping indication may configure the UE 115-*b* with a mapping between combinations of radio frequency bands and subsets of carriers of the group of carriers. In some examples, the mapping may be pre-configured at the UE 115-*b* and the base station 105-*b*. The mapping may be based on the capability reported by the UE 115-*b*. For example, the UE 115-*b* and the base station 105-*b* may be configured or pre-configured with a first mapping to use if the UE 115-*b* supports the simultaneous transmission of uplink messages on the two or more carriers. Additionally, or alternatively, the UE 115-*b* and the base station 105-*b* may be configured or pre-configured with a second mapping to use if the UE 115-*b* does not support the simultaneous transmission of uplink messages on the two or more carriers.

At 415, the base station 105-*b* may transmit a switch indication to the UE 115-*b* that indicates for the UE 115-*b* to switch to a subset of carriers of the group of carriers for transmission of an uplink message. The subset of carriers may be associated with a combination of radio frequency bands. The base station 105-*b* may transmit the switch indication in control signaling such as a MAC-CE or DCI.

At 420, the UE 115-*b* may select one or more carriers of the subset of carriers for transmitting the uplink message in accordance with the mapping (e.g., the first mapping or the second mapping based on the reported UE capability). For example, the UE 115-*b* may apply the mapping to determine on which carriers of the subset of carriers to transmit the uplink message, for example, based on the associated combination of frequency bands. For instance, the UE 115-*b* may access the mapping (e.g., a mapping table) to determine a first entry of the mapping corresponding to the associated combination of frequency bands. The UE 115-*b* may use the mapping to determine a second entry corresponding to the first entry that indicates which one or more carriers of the subset of carriers to use to transmit the uplink message. Based on the second entry, the UE 115-*b* may select the one or more carriers. In some examples, the UE 115-*b* may select the one or more carriers based on a previous subset of carriers of the group of carriers from which the UE is indicated to switch to the subset of carriers. In some examples, the UE 115-*b* may select the one or more carriers based on a next subset of carriers of the group of carriers to which the UE is scheduled to switch from the subset of carriers.

At 425, the UE 115-*b* may transmit the uplink message to the base station 105-*b* using the selected one or more carriers.

Figure 5:
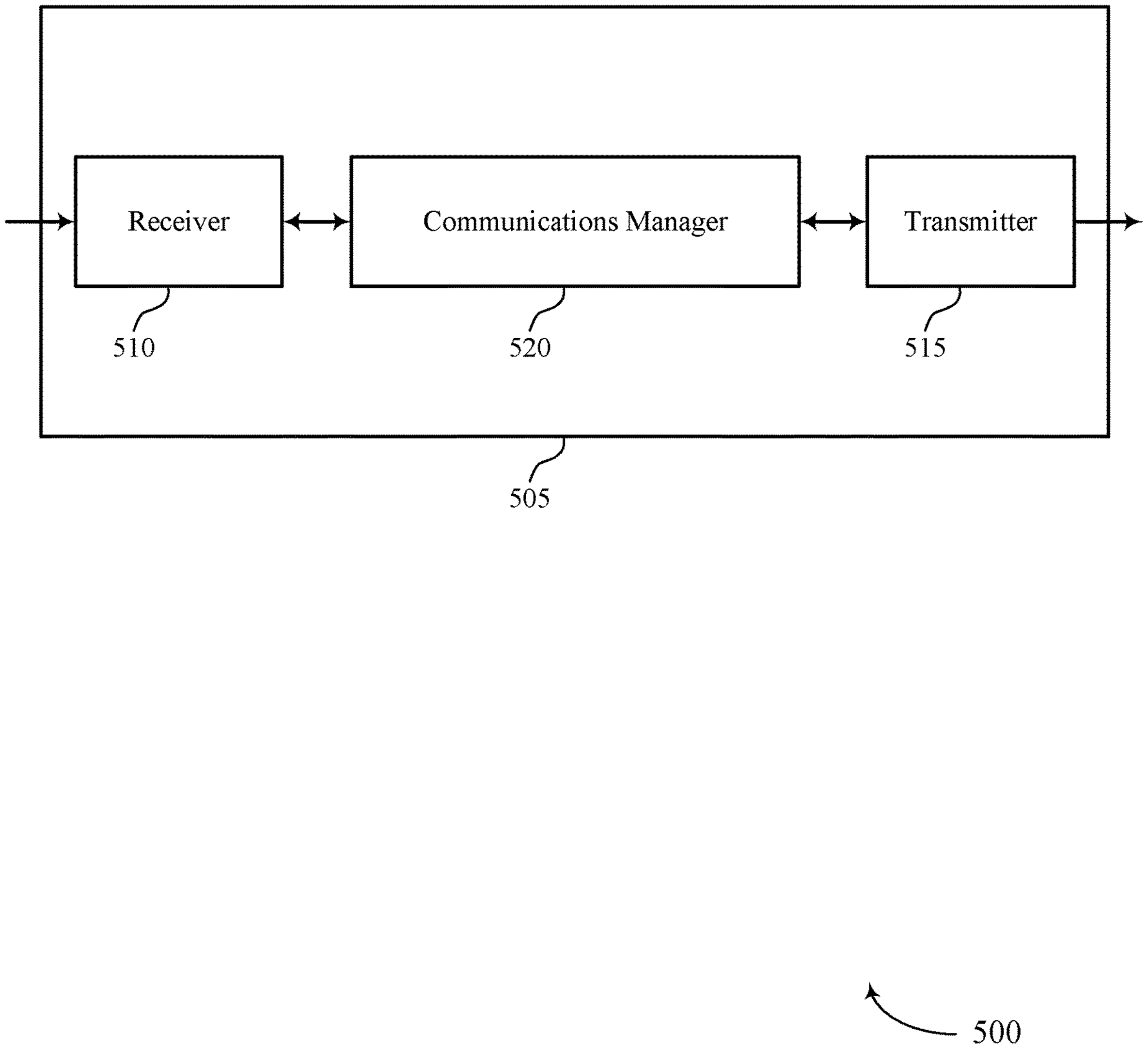
FIGS. 5 and 6 show block diagrams of devices that support SUL switching for switching multiple radio frequency bands in accordance with aspects of the present disclosure.

FIG. 5 shows a block diagram 500 of a device 505 that supports SUL switching for switching multiple radio frequency bands in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to SUL switching for switching multiple radio frequency bands). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to SUL switching for switching multiple radio frequency bands). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of SUL switching for switching multiple radio frequency bands as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication a UE in accordance with examples as disclosed herein. For example, the communications manager 520 may be configured as or otherwise support a means for transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The communications manager 520 may be configured as or otherwise support a means for receiving, from the base station and in response to the first control signaling, second control signaling that includes an indication for the UE to switch to a subset of carriers of the group of carriers for transmission of an uplink message, where the subset of carriers is associated with a combination of radio frequency bands. The communications manager 520 may be configured as or otherwise support a means for transmitting the uplink message to the base station on at least one of the subset of carriers in accordance with a mapping between the combination of radio frequency bands and the at least one of the subset of carriers, where the mapping is based on the UE capability.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources by removing scheduling ambiguity between the device 505 and a base station and by managing wireless communication over multiple carriers when switching radio frequency bands.

Figure 6:
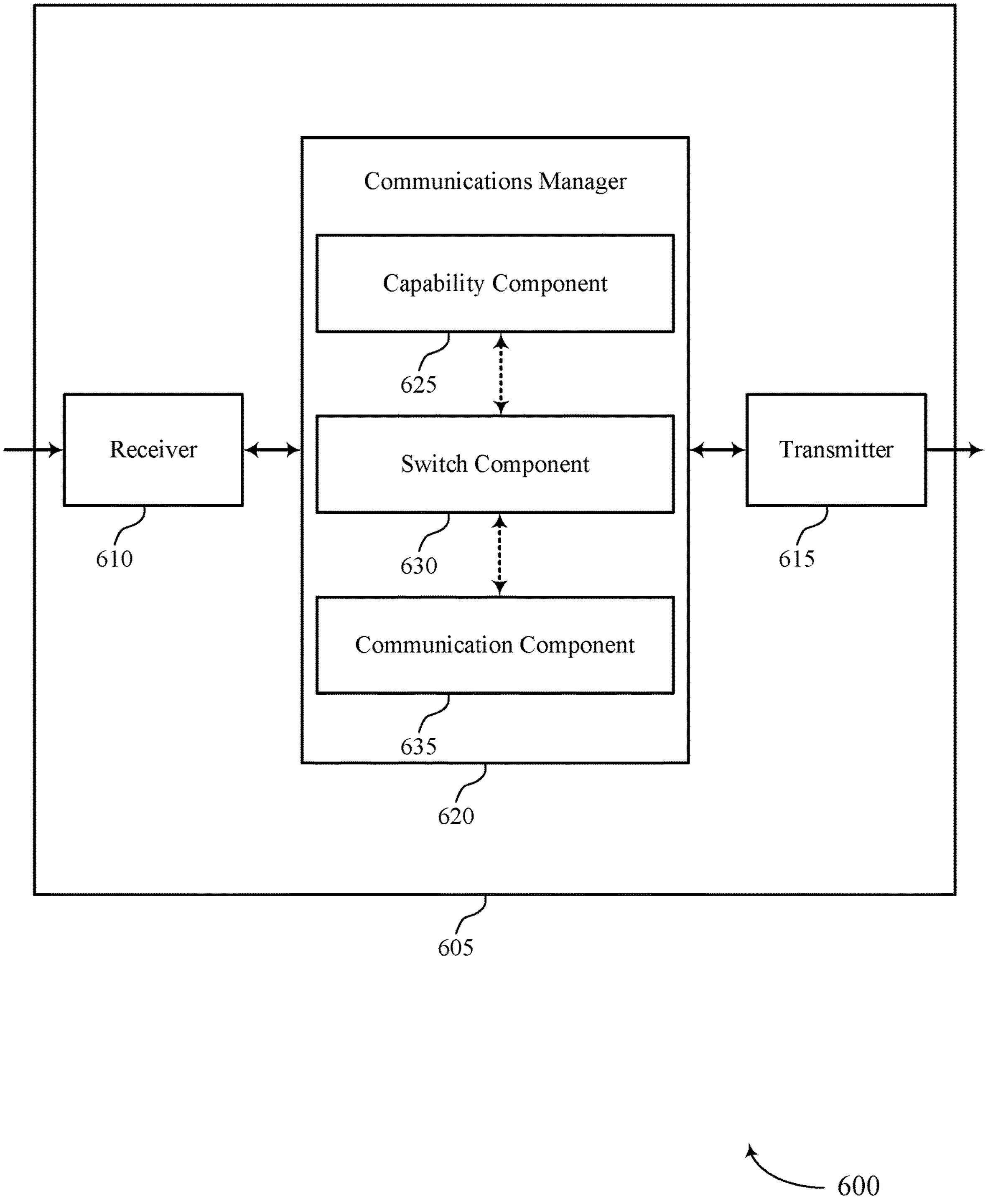

FIG. 6 shows a block diagram 600 of a device 605 that supports SUL switching for switching multiple radio frequency bands in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to SUL switching for switching multiple radio frequency bands). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to SUL switching for switching multiple radio frequency bands). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of SUL switching for switching multiple radio frequency bands as described herein. For example, the communications manager 620 may include a capability component 625, a switch component 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication a UE in accordance with examples as disclosed herein. The capability component 625 may be configured as or otherwise support a means for transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The switch component 630 may be configured as or otherwise support a means for receiving, from the base station and in response to the first control signaling, second control signaling that includes an indication for the UE to switch to a subset of carriers of the group of carriers for transmission of an uplink message, where the subset of carriers is associated with a combination of radio frequency bands. The communication component 635 may be configured as or otherwise support a means for transmitting the uplink message to the base station on at least one of the subset of carriers in accordance with a mapping between the combination of radio frequency bands and the at least one of the subset of carriers, where the mapping is based on the UE capability.

Figure 7:
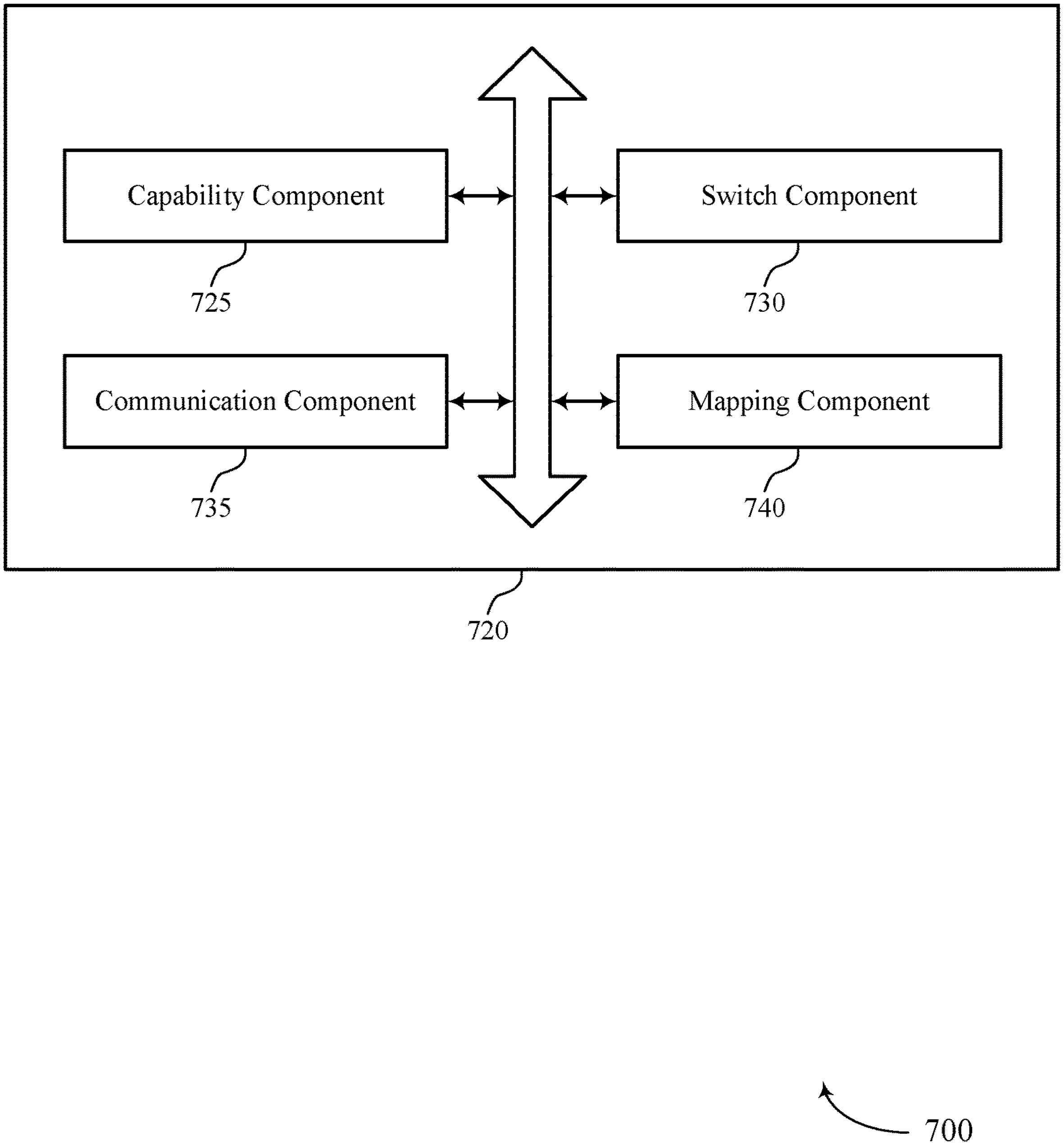
FIG. 7 shows a block diagram of a communications manager that supports SUL switching for switching multiple radio frequency bands in accordance with aspects of the present disclosure.

FIG. 7 shows a block diagram 700 of a communications manager 720 that supports SUL switching for switching multiple radio frequency bands in accordance with aspects of the present disclosure. The communications manager 720 may be an example of aspects of a communications manager 520, a communications manager 620, or both, as described herein. The communications manager 720, or various components thereof, may be an example of means for performing various aspects of SUL switching for switching multiple radio frequency bands as described herein. For example, the communications manager 720 may include a capability component 725, a switch component 730, a communication component 735, a mapping component 740, or any combination thereof. Each of these components may communicate, directly or indirectly, with one another (e.g., via one or more buses).

The communications manager 720 may support wireless communication a UE in accordance with examples as disclosed herein. The capability component 725 may be configured as or otherwise support a means for transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The switch component 730 may be configured as or otherwise support a means for receiving, from the base station and in response to the first control signaling, second control signaling that includes an indication for the UE to switch to a subset of carriers of the group of carriers for transmission of an uplink message, where the subset of carriers is associated with a combination of radio frequency bands. The communication component 735 may be configured as or otherwise support a means for transmitting the uplink message to the base station on at least one of the subset of carriers in accordance with a mapping between the combination of radio frequency bands and the at least one of the subset of carriers, where the mapping is based on the UE capability.

In some examples, to support transmitting the first control signaling indicating the UE capability, the capability component 725 may be configured as or otherwise support a means for transmitting the first control signaling indicating the UE capability to indicate that simultaneous transmission of uplink messages on two or more carriers is supported by the UE.

In some examples, the mapping component 740 may be configured as or otherwise support a means for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the first NUL carrier, the second NUL carrier, or both, for transmission of the uplink message.

In some examples, to support transmitting the first control signaling indicating the UE capability, the capability component 725 may be configured as or otherwise support a means for transmitting the first control signaling indicating the UE capability to indicate that simultaneous transmission of uplink messages on two or more carriers is unsupported by the UE.

In some examples, the mapping component 740 may be configured as or otherwise support a means for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the first NUL carrier for transmission of the uplink message based on switching from the second NUL carrier or being scheduled to switch to the second NUL carrier to transmit a next uplink message.

In some examples, the mapping component 740 may be configured as or otherwise support a means for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the second NUL carrier for transmission of the uplink message based on switching from the first NUL carrier or being scheduled to switch to the first NUL carrier to transmit a next uplink message.

In some examples, the mapping component 740 may be configured as or otherwise support a means for applying the mapping from the combination of radio frequency bands to the at least one of the subset of carriers, where the combination of radio frequency bands includes a first radio frequency band associated with the SUL carrier and a second radio frequency band associated with an NUL carrier of the at least two NUL carriers, and where the at least one of the subset of carriers includes the NUL carrier for transmission of the uplink message based on switching from the SUL carrier or being scheduled to switch to the SUL carrier to transmit a next uplink message.

In some examples, the mapping component 740 may be configured as or otherwise support a means for applying the mapping from the combination of radio frequency bands to the at least one of the subset of carriers, where the combination of radio frequency bands includes a first radio frequency band associated with the SUL carrier and a second radio frequency band associated with an NUL carrier of the at least two NUL carriers, and where the at least one of the subset of carriers includes the SUL carrier for transmission of the uplink message based on switching from the NUL carrier or being scheduled to switch to the NUL carrier to transmit a next uplink message.

In some examples, the mapping component 740 may be configured as or otherwise support a means for applying the mapping from the combination of radio frequency bands to the at least one of the subset of carriers, where the combination of radio frequency bands includes a radio frequency band associated with an NUL carrier of the at least two NUL carriers, and where the at least one of the subset of carriers includes the NUL carrier for transmission of the uplink message using one antenna port or two antenna ports.

In some examples, the mapping component 740 may be configured as or otherwise support a means for applying the mapping from the combination of radio frequency bands to the at least one of the subset of carriers, where the combination of radio frequency bands includes a radio frequency band associated with the SUL carrier, and where the at least one of the subset of carriers includes the SUL carrier for transmission of the uplink message using one antenna port or two antenna ports.

In some examples, the mapping component 740 may be configured as or otherwise support a means for selecting the at least one of the subset of carriers in accordance with the mapping based on a previous subset of carriers of the group of carriers from which the UE is indicated to switch to the subset of carriers.

In some examples, the mapping component 740 may be configured as or otherwise support a means for selecting the at least one of the subset of carriers in accordance with the mapping based on a next subset of carriers of the group of carriers to which the UE is scheduled to switch from the subset of carriers.

Figure 8:
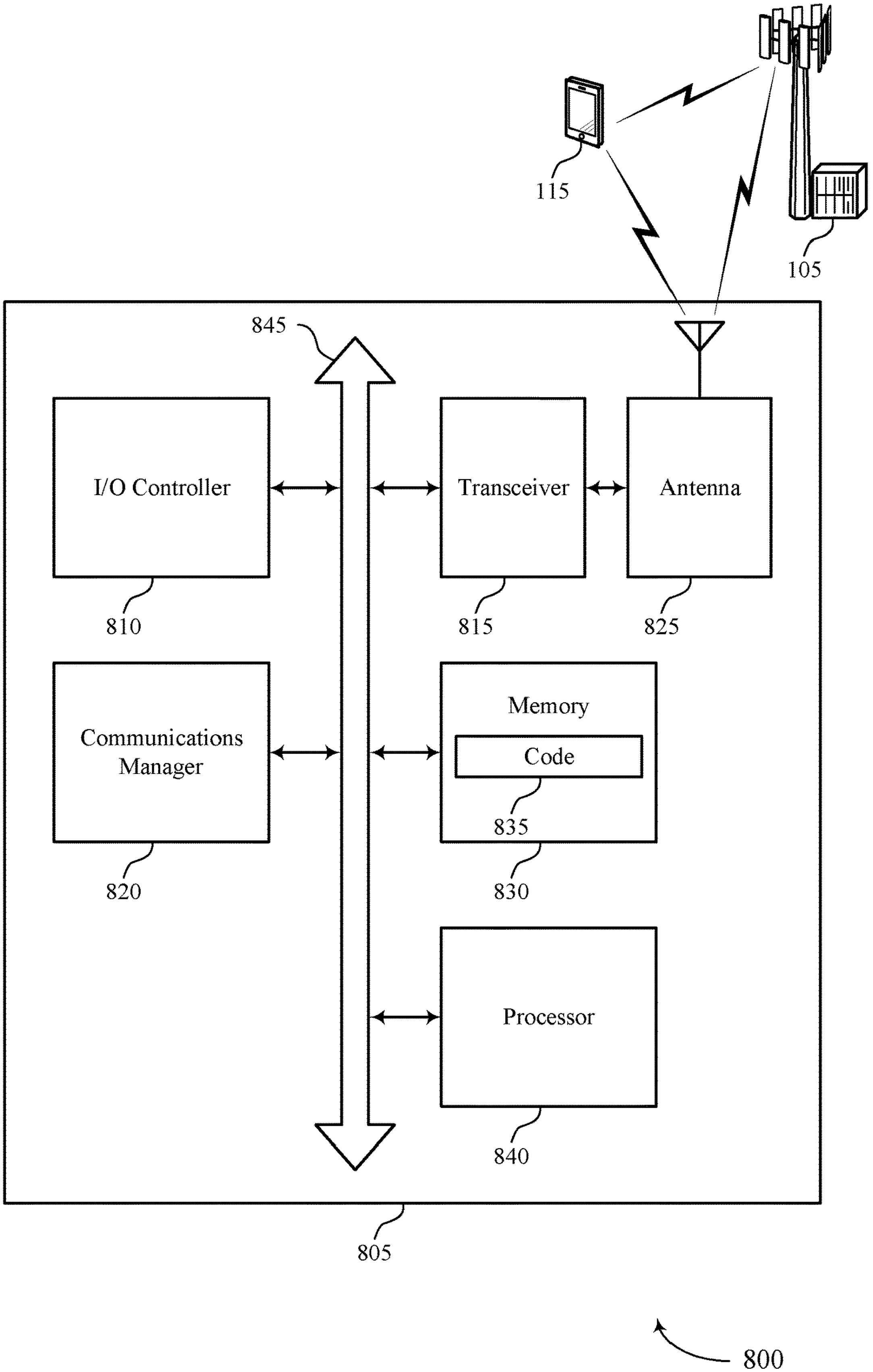
FIG. 8 shows a diagram of a system including a device that supports SUL switching for switching multiple radio frequency bands in accordance with aspects of the present disclosure.

FIG. 8 shows a diagram of a system 800 including a device 805 that supports SUL switching for switching multiple radio frequency bands in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting SUL switching for switching multiple radio frequency bands). For example, the device 805 or a component of the device 805 may include a processor 840 and memory 830 coupled to the processor 840, the processor 840 and memory 830 configured to perform various functions described herein.

The communications manager 820 may support wireless communication a UE in accordance with examples as disclosed herein. For example, the communications manager 820 may be configured as or otherwise support a means for transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The communications manager 820 may be configured as or otherwise support a means for receiving, from the base station and in response to the first control signaling, second control signaling that includes an indication for the UE to switch to a subset of carriers of the group of carriers for transmission of an uplink message, where the subset of carriers is associated with a combination of radio frequency bands. The communications manager 820 may be configured as or otherwise support a means for transmitting the uplink message to the base station on at least one of the subset of carriers in accordance with a mapping between the combination of radio frequency bands and the at least one of the subset of carriers, where the mapping is based on the UE capability.

By including or configuring the communications manager 820 in accordance with examples as described herein, the device 805 may support techniques for improved scheduling, resource usage, reliability, latency, power consumption, battery life, and coordination between devices, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of SUL switching for switching multiple radio frequency bands as described herein, or the processor 840 and the memory 830 may be otherwise configured to perform or support such operations.

Figure 9:
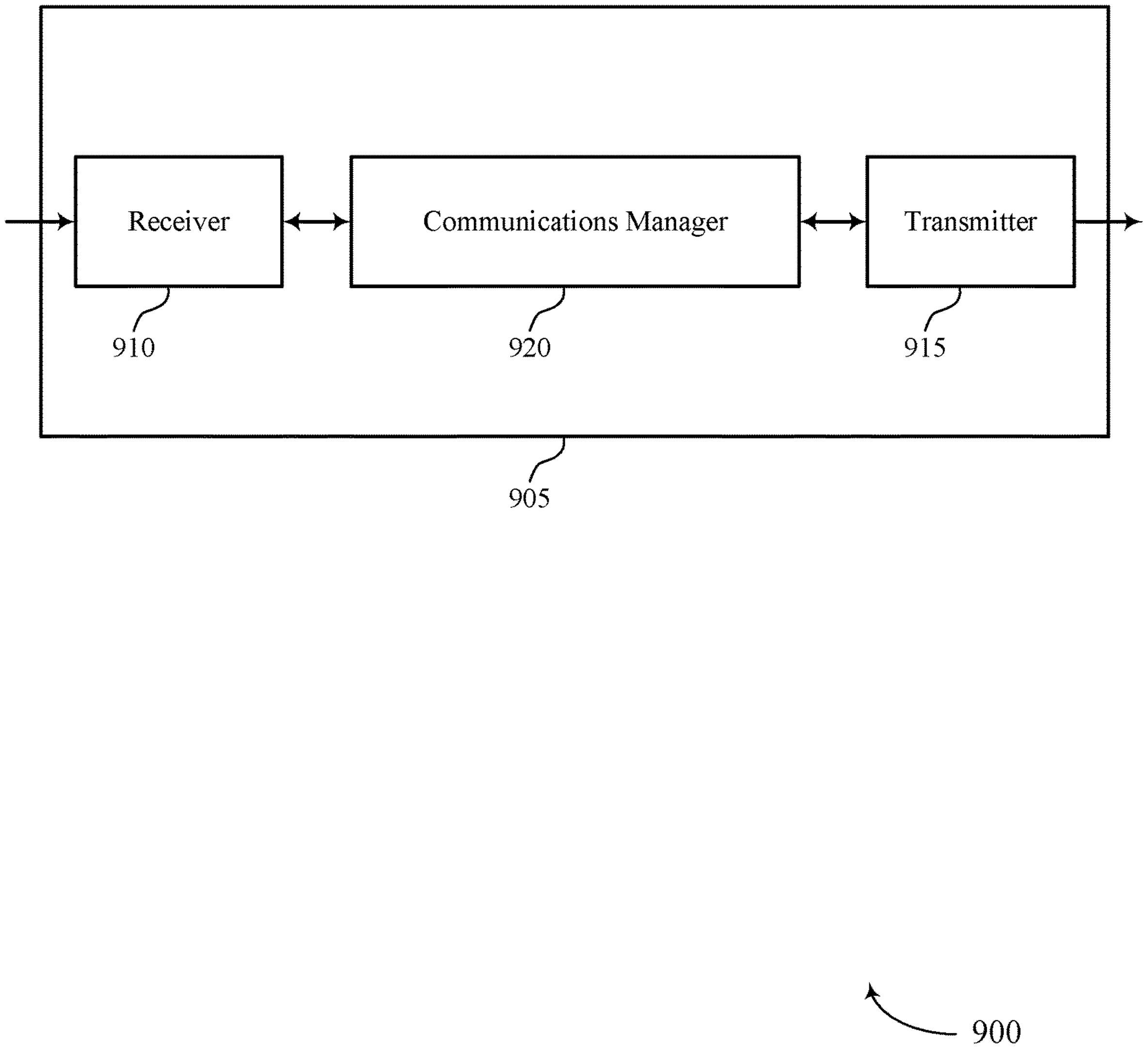
FIGS. 9 and 10 show block diagrams of devices that support SUL switching for switching multiple radio frequency bands in accordance with aspects of the present disclosure.

FIG. 9 shows a block diagram 900 of a device 905 that supports SUL switching for switching multiple radio frequency bands in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to SUL switching for switching multiple radio frequency bands). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to SUL switching for switching multiple radio frequency bands). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of SUL switching for switching multiple radio frequency bands as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The communications manager 920 may be configured as or otherwise support a means for transmitting, to the UE and in response to the first control signaling, second control signaling that includes an indication for the UE to switch to a subset of carriers of the group of carriers for transmission of an uplink message, where the subset of carriers is associated with a combination of radio frequency bands. The communications manager 920 may be configured as or otherwise support a means for receiving the uplink message from the UE on at least one of the subset of carriers in accordance with a mapping between the combination of radio frequency bands and the at least one of the subset of carriers, where the mapping is based on the UE capability.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources by removing scheduling ambiguity between the device 505 and a UE and by managing wireless communication over multiple carriers when switching radio frequency bands.

Figure 10:
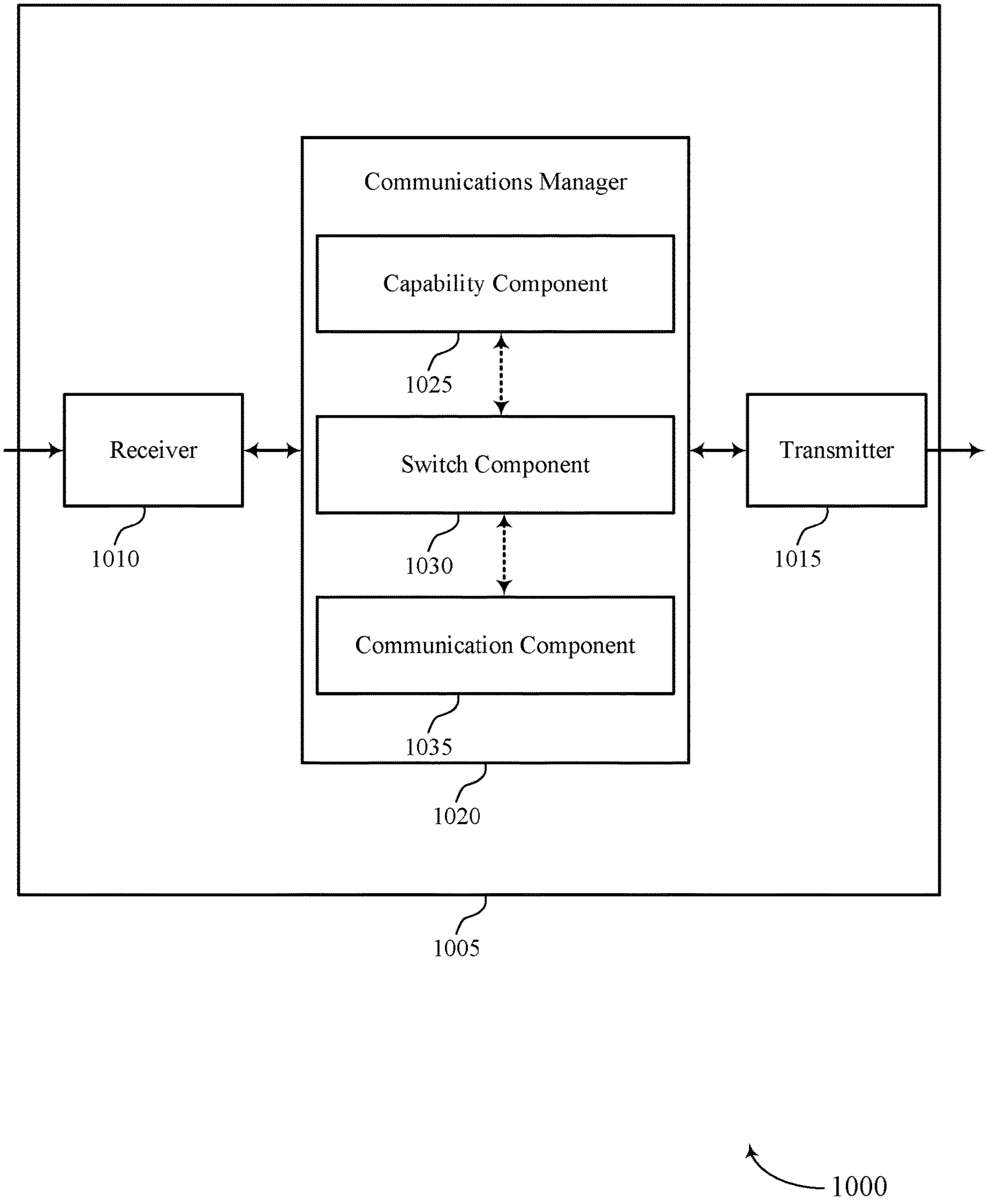

FIG. 10 shows a block diagram 1000 of a device 1005 that supports SUL switching for switching multiple radio frequency bands in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to SUL switching for switching multiple radio frequency bands). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to SUL switching for switching multiple radio frequency bands). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of SUL switching for switching multiple radio frequency bands as described herein. For example, the communications manager 1020 may include a capability component 1025, a switch component 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The capability component 1025 may be configured as or otherwise support a means for receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The switch component 1030 may be configured as or otherwise support a means for transmitting, to the UE and in response to the first control signaling, second control signaling that includes an indication for the UE to switch to a subset of carriers of the group of carriers for transmission of an uplink message, where the subset of carriers is associated with a combination of radio frequency bands. The communication component 1035 may be configured as or otherwise support a means for receiving the uplink message from the UE on at least one of the subset of carriers in accordance with a mapping between the combination of radio frequency bands and the at least one of the subset of carriers, where the mapping is based on the UE capability.

Figure 11:
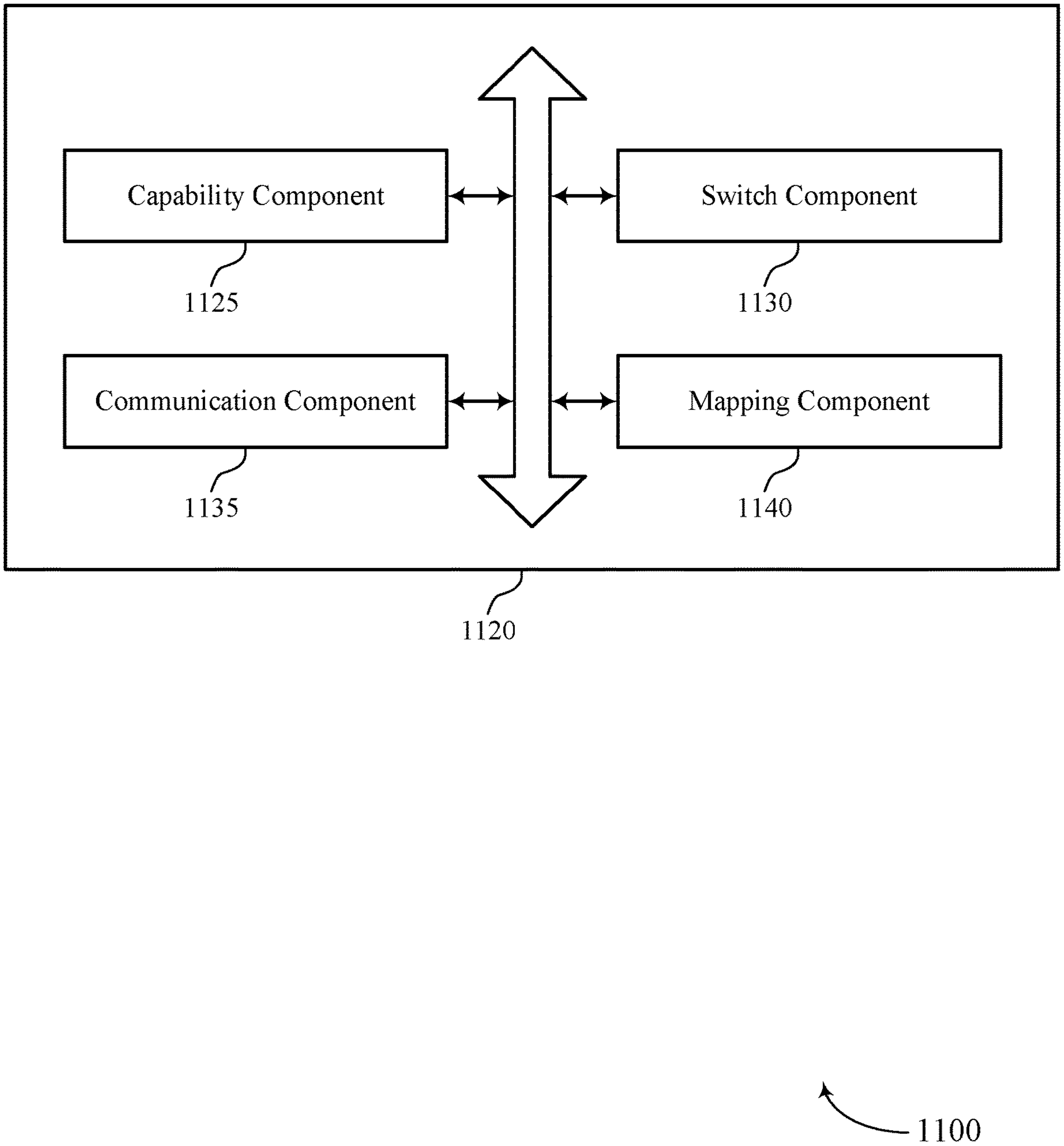
FIG. 11 shows a block diagram of a communications manager that supports SUL switching for switching multiple radio frequency bands in accordance with aspects of the present disclosure.

FIG. 11 shows a block diagram 1100 of a communications manager 1120 that supports SUL switching for switching multiple radio frequency bands in accordance with aspects of the present disclosure. The communications manager 1120 may be an example of aspects of a communications manager 920, a communications manager 1020, or both, as described herein. The communications manager 1120, or various components thereof, may be an example of means for performing various aspects of SUL switching for switching multiple radio frequency bands as described herein. For example, the communications manager 1120 may include a capability component 1125, a switch component 1130, a communication component 1135, a mapping component 1140, or any combination thereof. Each of these components may communicate, directly or indirectly, with one another (e.g., via one or more buses).

The communications manager 1120 may support wireless communication at a base station in accordance with examples as disclosed herein. The capability component 1125 may be configured as or otherwise support a means for receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The switch component 1130 may be configured as or otherwise support a means for transmitting, to the UE and in response to the first control signaling, second control signaling that includes an indication for the UE to switch to a subset of carriers of the group of carriers for transmission of an uplink message, where the subset of carriers is associated with a combination of radio frequency bands. The communication component 1135 may be configured as or otherwise support a means for receiving the uplink message from the UE on at least one of the subset of carriers in accordance with a mapping between the combination of radio frequency bands and the at least one of the subset of carriers, where the mapping is based on the UE capability.

In some examples, the UE capability indicates that simultaneous transmission of uplink messages on two or more carriers is supported by the UE.

In some examples, the mapping component 1140 may be configured as or otherwise support a means for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the first NUL carrier, the second NUL carrier, or both, for transmission of the uplink message.

In some examples, the UE capability indicates that simultaneous transmission of uplink messages on more than one carrier is unsupported by the UE.

In some examples, the mapping component 1140 may be configured as or otherwise support a means for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the first NUL carrier for transmission of the uplink message based on switching from the second NUL carrier or being scheduled to switch to the second NUL carrier to transmit a next uplink message.

In some examples, the mapping component 1140 may be configured as or otherwise support a means for applying the mapping from the combination of radio frequency bands to the at least one of the subset of carriers, where the combination of radio frequency bands includes a first radio frequency band associated with a first NUL carrier of the at least two NUL carriers and a second radio frequency band associated with a second NUL carrier of the at least two NUL carriers, and where the at least one of the subset of carriers includes the second NUL carrier for transmission of the uplink message based on switching from the first NUL carrier or being scheduled to switch to the first NUL carrier to transmit a next uplink message.

In some examples, the mapping component 1140 may be configured as or otherwise support a means for applying the mapping from the combination of radio frequency bands to the at least one of the subset of carriers, where the combination of radio frequency bands includes a first radio frequency band associated with the SUL carrier and a second radio frequency band associated with an NUL carrier of the at least two NUL carriers, and where the at least one of the subset of carriers includes the NUL carrier for transmission of the uplink message based on switching from the SUL carrier or being scheduled to switch to the SUL carrier to transmit a next uplink message.

In some examples, the mapping component 1140 may be configured as or otherwise support a means for applying the mapping from the combination of radio frequency bands to the at least one of the subset of carriers, where the combination of radio frequency bands includes a first radio frequency band associated with the SUL carrier and a second radio frequency band associated with an NUL carrier of the at least two NUL carriers, and where the at least one of the subset of carriers includes the SUL carrier for transmission of the uplink message based on switching from the NUL carrier or being scheduled to switch to the NUL carrier to transmit a next uplink message.

In some examples, the mapping component 1140 may be configured as or otherwise support a means for applying the mapping from the combination of radio frequency bands to the at least one of the subset of carriers, where the combination of radio frequency bands includes a radio frequency band associated with an NUL carrier of the at least two NUL carriers, and where the at least one of the subset of carriers includes the NUL carrier for transmission of the uplink message using one antenna port or two antenna ports.

In some examples, the mapping component 1140 may be configured as or otherwise support a means for applying the mapping from the combination of radio frequency bands to the at least one of the subset of carriers, where the combination of radio frequency bands includes a radio frequency band associated with the SUL carrier, and where the at least one of the subset of carriers includes the SUL carrier for transmission of the uplink message using one antenna port or two antenna ports.

In some examples, the mapping indicates the at least one of the subset of carriers based on a previous subset of carriers of the group of carriers from which the UE is indicated to switch to the subset of carriers.

In some examples, the mapping indicates the at least one of the subset of carriers based on a next subset of carriers of the group of carriers to which the UE is scheduled to switch from the subset of carriers.

Figure 12:
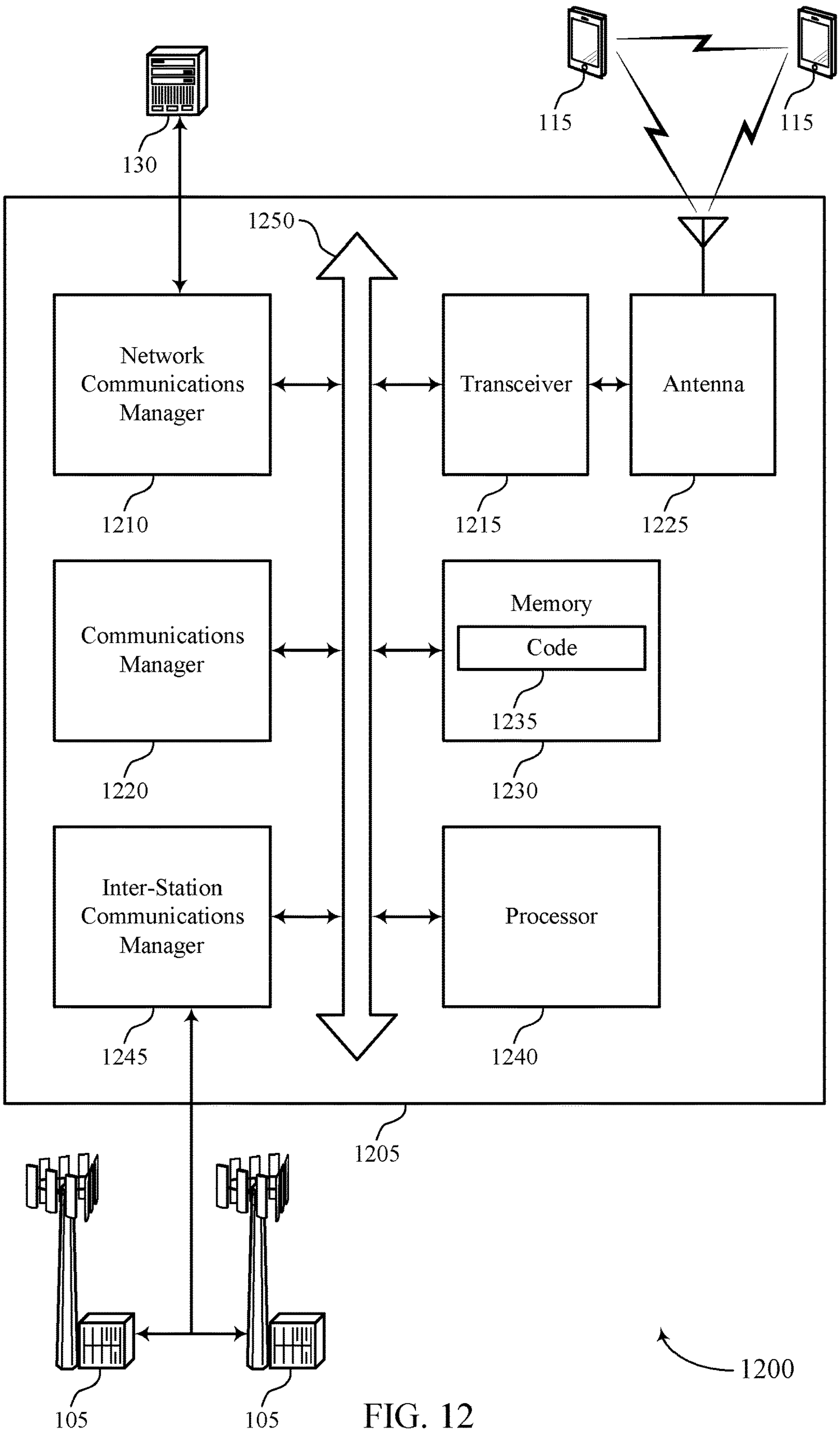
FIG. 12 shows a diagram of a system including a device that supports SUL switching for switching multiple radio frequency bands in accordance with aspects of the present disclosure.

FIG. 12 shows a diagram of a system 1200 including a device 1205 that supports SUL switching for switching multiple radio frequency bands in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting SUL switching for switching multiple radio frequency bands). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The communications manager 1220 may be configured as or otherwise support a means for transmitting, to the UE and in response to the first control signaling, second control signaling that includes an indication for the UE to switch to a subset of carriers of the group of carriers for transmission of an uplink message, where the subset of carriers is associated with a combination of radio frequency bands. The communications manager 1220 may be configured as or otherwise support a means for receiving the uplink message from the UE on at least one of the subset of carriers in accordance with a mapping between the combination of radio frequency bands and the at least one of the subset of carriers, where the mapping is based on the UE capability.

By including or configuring the communications manager 1220 in accordance with examples as described herein, the device 1205 may support techniques for improved scheduling, resource usage, reliability, latency, power consumption, and coordination between devices, among other benefits In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of SUL switching for switching multiple radio frequency bands as described herein, or the processor 1240 and the memory 1230 may be otherwise configured to perform or support such operations.

Figure 13:
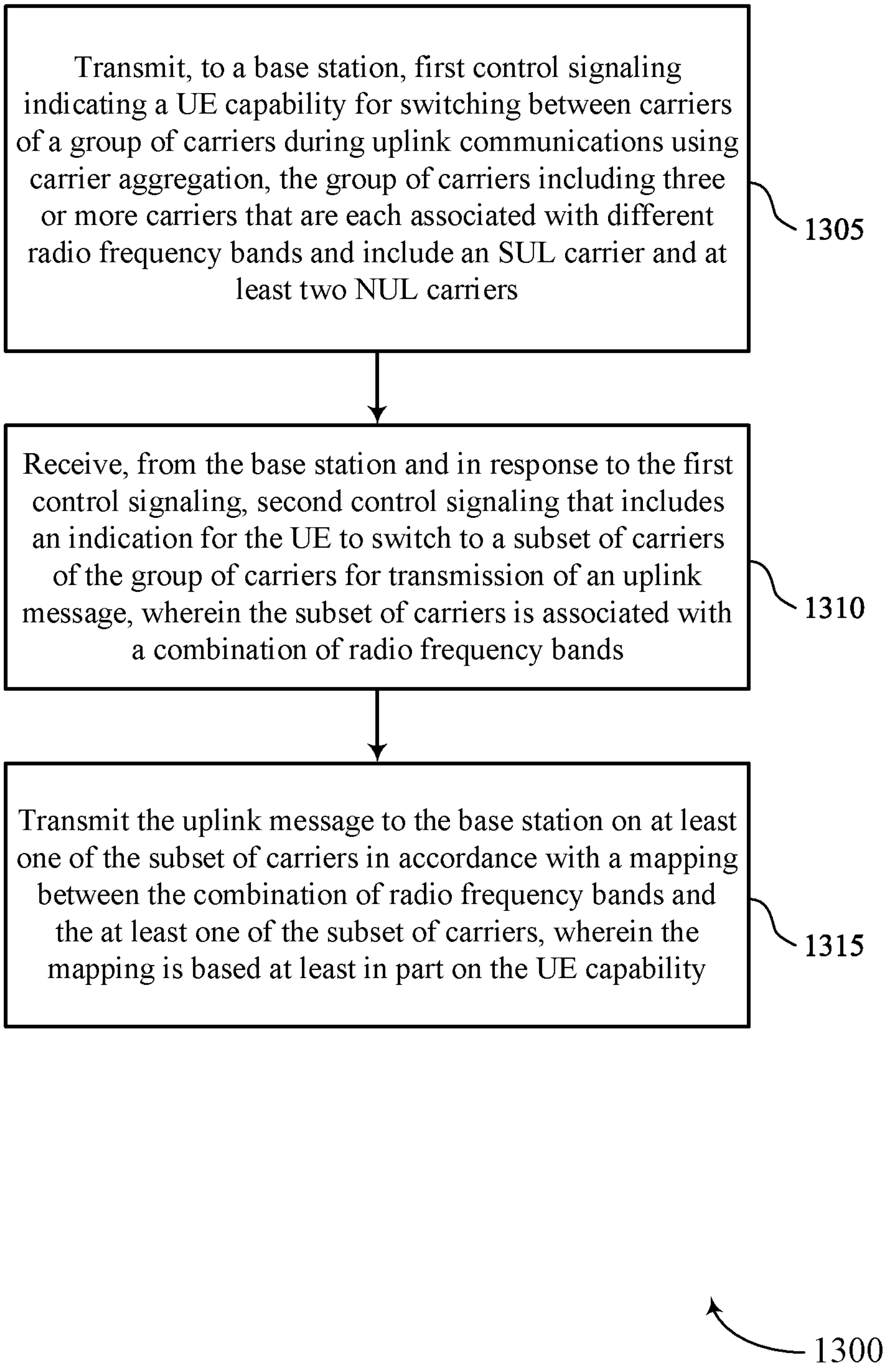
FIGS. 13 through 17 show flowcharts illustrating methods that support SUL switching for switching multiple radio frequency bands in accordance with aspects of the present disclosure.

FIG. 13 shows a flowchart illustrating a method 1300 that supports SUL switching for switching multiple radio frequency bands in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The operations of 1305 may be performed in accordance with examples as disclosed herein. In some examples, aspects of the operations of 1305 may be performed by a capability component 725 as described with reference to FIG. 7.

At 1310, the method may include receiving, from the base station and in response to the first control signaling, second control signaling that includes an indication for the UE to switch to a subset of carriers of the group of carriers for transmission of an uplink message, where the subset of carriers is associated with a combination of radio frequency bands. The operations of 1310 may be performed in accordance with examples as disclosed herein. In some examples, aspects of the operations of 1310 may be performed by a switch component 730 as described with reference to FIG. 7.

At 1315, the method may include transmitting the uplink message to the base station on at least one of the subset of carriers in accordance with a mapping between the combination of radio frequency bands and the at least one of the subset of carriers, where the mapping is based on the UE capability. The operations of 1315 may be performed in accordance with examples as disclosed herein. In some examples, aspects of the operations of 1315 may be performed by a communication component 735 as described with reference to FIG. 7.

Figure 14:
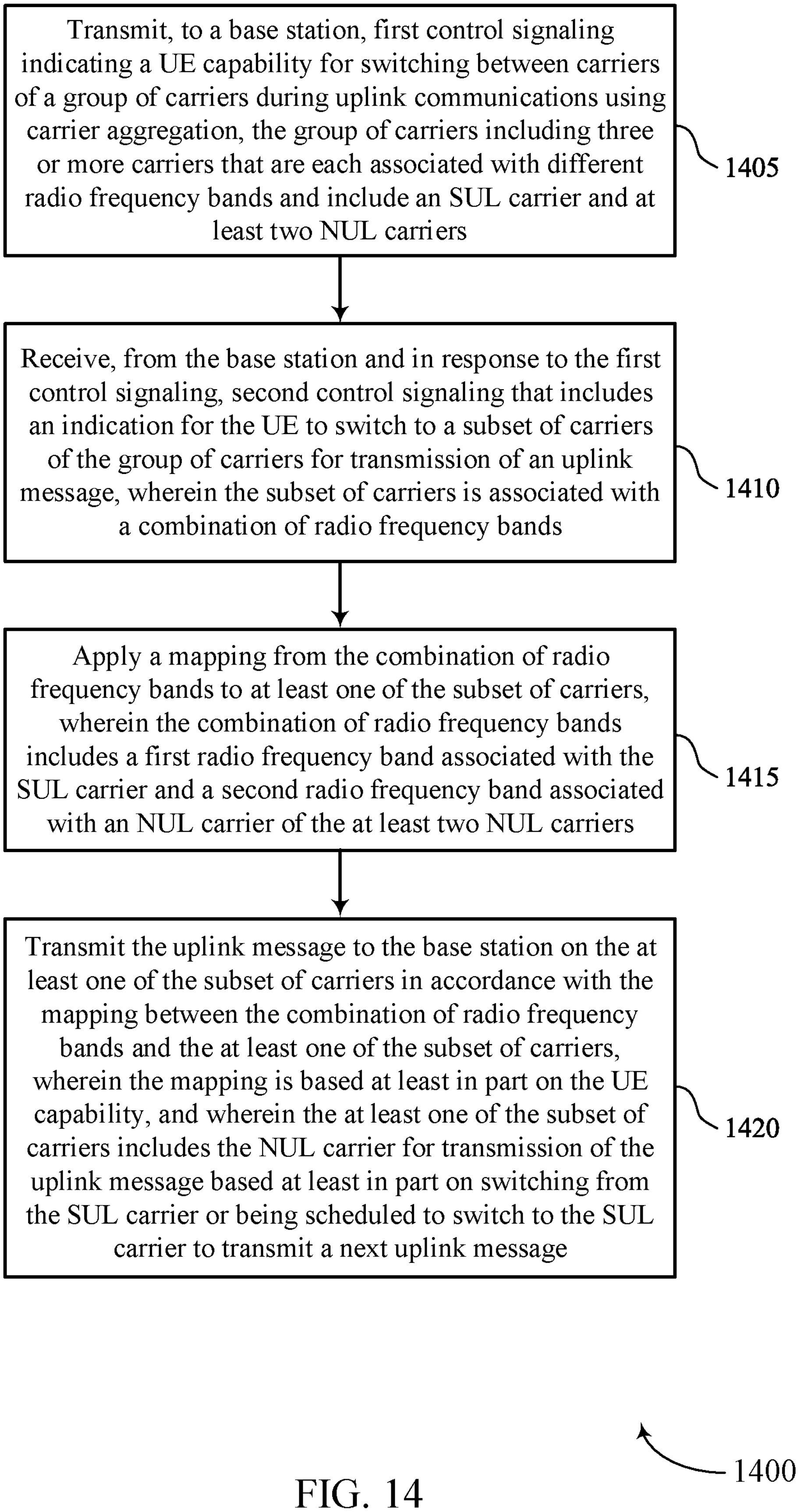

FIG. 14 shows a flowchart illustrating a method 1400 that supports SUL switching for switching multiple radio frequency bands in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The operations of 1405 may be performed in accordance with examples as disclosed herein. In some examples, aspects of the operations of 1405 may be performed by a capability component 725 as described with reference to FIG. 7.

At 1410, the method may include receiving, from the base station and in response to the first control signaling, second control signaling that includes an indication for the UE to switch to a subset of carriers of the group of carriers for transmission of an uplink message, where the subset of carriers is associated with a combination of radio frequency bands. The operations of 1410 may be performed in accordance with examples as disclosed herein. In some examples, aspects of the operations of 1410 may be performed by a switch component 730 as described with reference to FIG. 7.

At 1415, the method may include applying a mapping from the combination of radio frequency bands to at least one of the subset of carriers, where the combination of radio frequency bands includes a first radio frequency band associated with the SUL carrier and a second radio frequency band associated with an NUL carrier of the at least two NUL carriers. The operations of 1415 may be performed in accordance with examples as disclosed herein. In some examples, aspects of the operations of 1415 may be performed by a mapping component 740 as described with reference to FIG. 7.

At 1420, the method may include transmitting the uplink message to the base station on the at least one of the subset of carriers in accordance with the mapping between the combination of radio frequency bands and the at least one of the subset of carriers, where the mapping is based on the UE capability, and where the at least one of the subset of carriers includes the NUL carrier for transmission of the uplink message based on switching from the SUL carrier or being scheduled to switch to the SUL carrier to transmit a next uplink message. The operations of 1420 may be performed in accordance with examples as disclosed herein. In some examples, aspects of the operations of 1420 may be performed by a communication component 735 as described with reference to FIG. 7.

Figure 15:
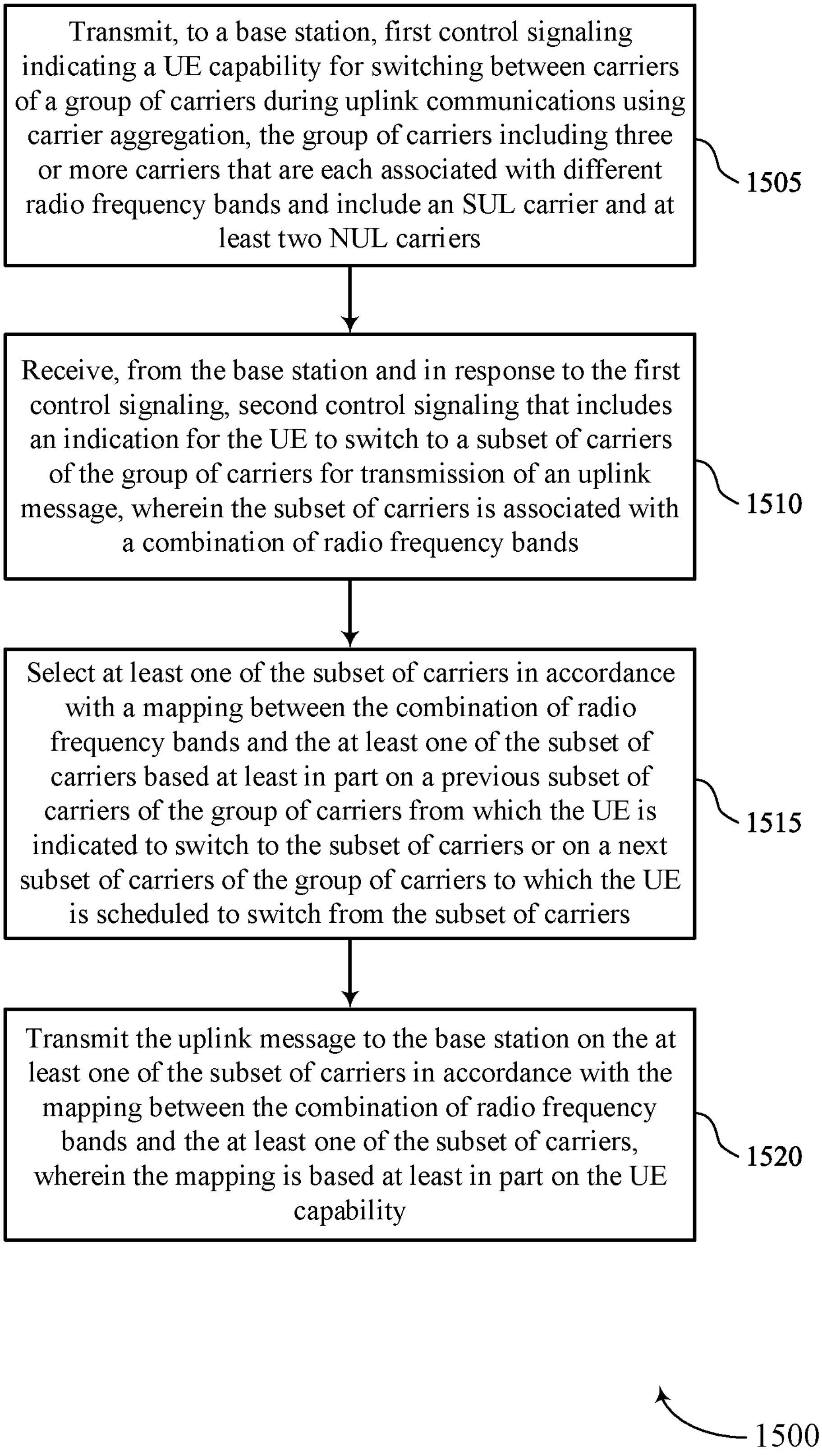

FIG. 15 shows a flowchart illustrating a method 1500 that supports SUL switching for switching multiple radio frequency bands in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The operations of 1505 may be performed in accordance with examples as disclosed herein. In some examples, aspects of the operations of 1505 may be performed by a capability component 725 as described with reference to FIG. 7.

At 1510, the method may include receiving, from the base station and in response to the first control signaling, second control signaling that includes an indication for the UE to switch to a subset of carriers of the group of carriers for transmission of an uplink message, where the subset of carriers is associated with a combination of radio frequency bands. The operations of 1510 may be performed in accordance with examples as disclosed herein. In some examples, aspects of the operations of 1510 may be performed by a switch component 730 as described with reference to FIG. 7.

At 1515, the method may include selecting at least one of the subset of carriers in accordance with a mapping between the combination of radio frequency bands and the at least one of the subset of carriers based on a previous subset of carriers of the group of carriers from which the UE is indicated to switch to the subset of carriers or on a next subset of carriers of the group of carriers to which the UE is scheduled to switch from the subset of carriers. The operations of 1515 may be performed in accordance with examples as disclosed herein. In some examples, aspects of the operations of 1515 may be performed by a mapping component 740 as described with reference to FIG. 7.

At 1520, the method may include transmitting the uplink message to the base station on the at least one of the subset of carriers in accordance with the mapping between the combination of radio frequency bands and the at least one of the subset of carriers, where the mapping is based on the UE capability. The operations of 1520 may be performed in accordance with examples as disclosed herein. In some examples, aspects of the operations of 1520 may be performed by a communication component 735 as described with reference to FIG. 7.

Figure 16:
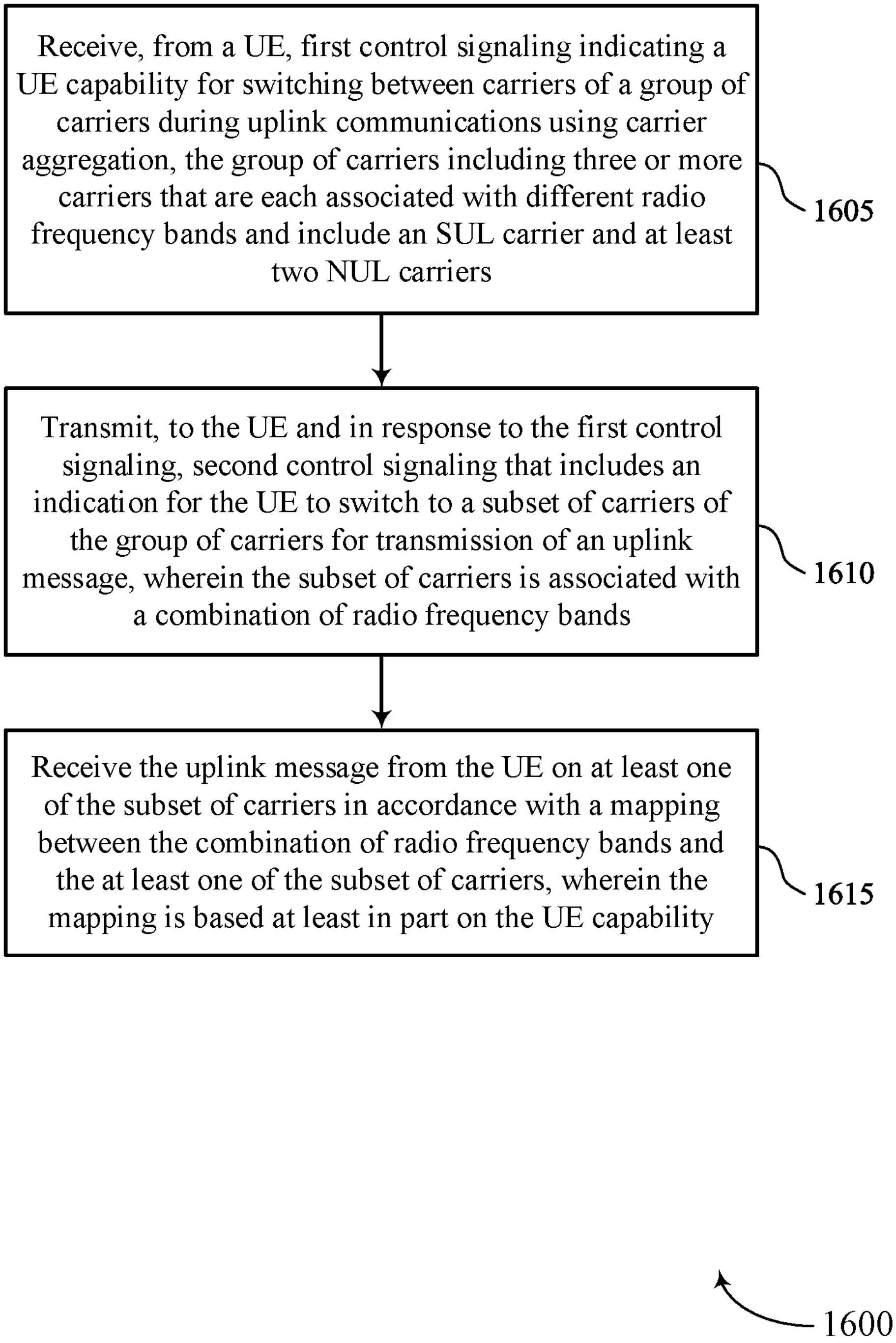

FIG. 16 shows a flowchart illustrating a method 1600 that supports SUL switching for switching multiple radio frequency bands in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The operations of 1605 may be performed in accordance with examples as disclosed herein. In some examples, aspects of the operations of 1605 may be performed by a capability component 1125 as described with reference to FIG. 11.

At 1610, the method may include transmitting, to the UE and in response to the first control signaling, second control signaling that includes an indication for the UE to switch to a subset of carriers of the group of carriers for transmission of an uplink message, where the subset of carriers is associated with a combination of radio frequency bands. The operations of 1610 may be performed in accordance with examples as disclosed herein. In some examples, aspects of the operations of 1610 may be performed by a switch component 1130 as described with reference to FIG. 11.

At 1615, the method may include receiving the uplink message from the UE on at least one of the subset of carriers in accordance with a mapping between the combination of radio frequency bands and the at least one of the subset of carriers, where the mapping is based on the UE capability. The operations of 1615 may be performed in accordance with examples as disclosed herein. In some examples, aspects of the operations of 1615 may be performed by a communication component 1135 as described with reference to FIG. 11.

Figure 17:
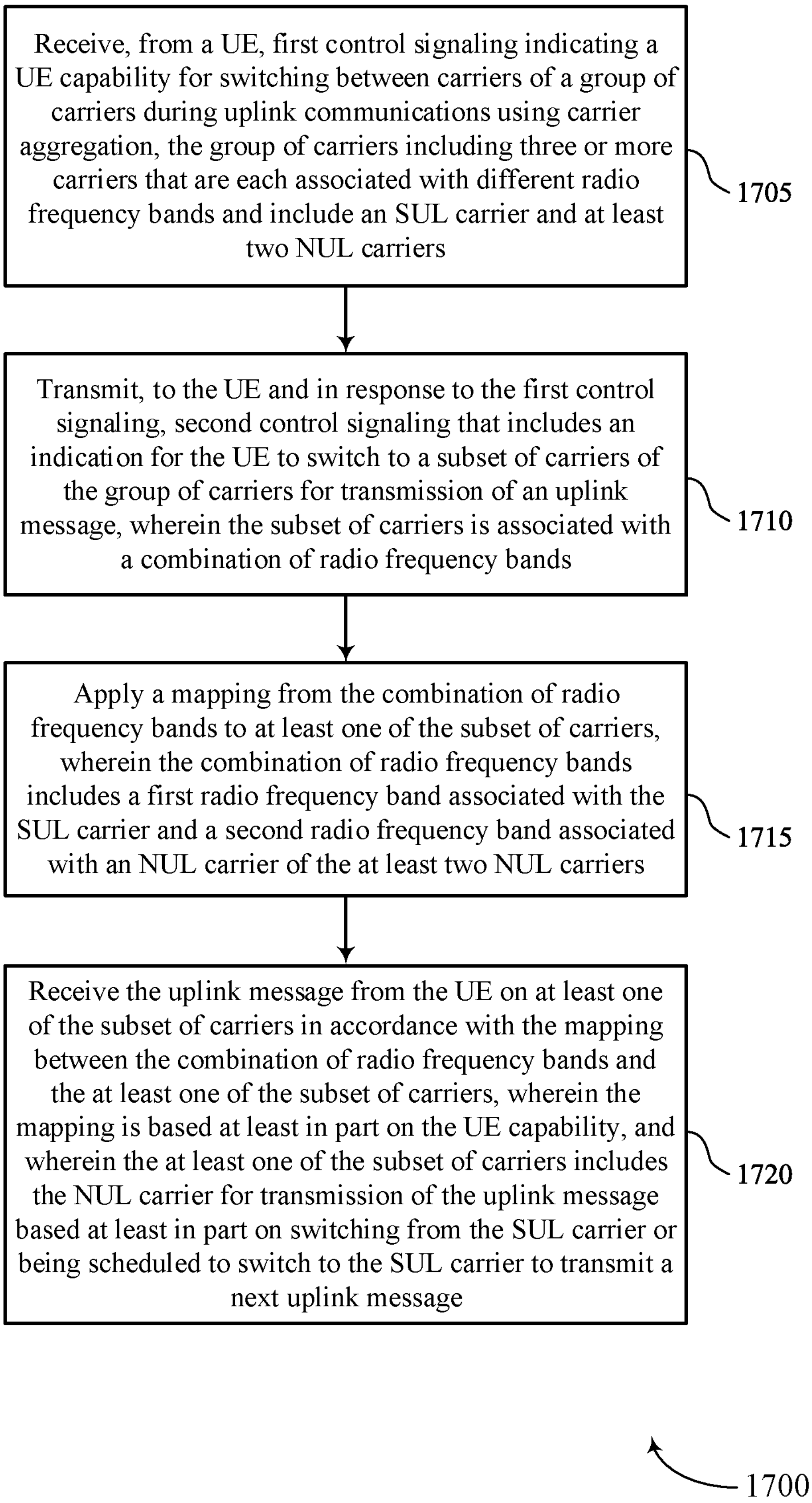

FIG. 17 shows a flowchart illustrating a method 1700 that supports SUL switching for switching multiple radio frequency bands in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers. The operations of 1705 may be performed in accordance with examples as disclosed herein. In some examples, aspects of the operations of 1705 may be performed by a capability component 1125 as described with reference to FIG. 11.

At 1710, the method may include transmitting, to the UE and in response to the first control signaling, second control signaling that includes an indication for the UE to switch to a subset of carriers of the group of carriers for transmission of an uplink message, where the subset of carriers is associated with a combination of radio frequency bands. The operations of 1710 may be performed in accordance with examples as disclosed herein. In some examples, aspects of the operations of 1710 may be performed by a switch component 1130 as described with reference to FIG. 11.

At 1715, the method may include applying a mapping from the combination of radio frequency bands to at least one of the subset of carriers, where the combination of radio frequency bands includes a first radio frequency band associated with the SUL carrier and a second radio frequency band associated with an NUL carrier of the at least two NUL carriers. The operations of 1715 may be performed in accordance with examples as disclosed herein. In some examples, aspects of the operations of 1715 may be performed by a mapping component 1140 as described with reference to FIG. 11.

At 1720, the method may include receiving the uplink message from the UE on at least one of the subset of carriers in accordance with the mapping between the combination of radio frequency bands and the at least one of the subset of carriers, where the mapping is based at least in part on the UE capability, and where the at least one of the subset of carriers includes the NUL carrier for transmission of the uplink message based at least in part on switching from the SUL carrier or being scheduled to switch to the SUL carrier to transmit a next uplink message. The operations of 1720 may be performed in accordance with examples as disclosed herein. In some examples, aspects of the operations of 1720 may be performed by a communication component 1135 as described with reference to FIG. 11.

The following provides an overview of aspects of the present disclosure:

Aspect 1: A method for wireless communication a UE, comprising: transmitting, to a base station, first control signaling indicating a UE capability for switching between carriers of a group of carriers during uplink communications using carrier aggregation, the group of carriers including three or more carriers that are each associated with different radio frequency bands and include an SUL carrier and at least two NUL carriers; receiving, from the base station and in response to the first control signaling, second control signaling that includes an indication for the UE to switch to a subset of carriers of the group of carriers for transmission of an uplink message, wherein the subset of carriers is associated with a combination of radio frequency bands; and transmitting the uplink message to the base station on at least one of the subset of carriers in accordance with a mapping between the combination of radio frequency bands and the at least one of the subset of carriers, wherein the mapping is based at least in part on the UE capability.

Aspect 2: The method of aspect 1, wherein transmitting the first control signaling indicating the UE capability further comprises: transmitting the first control signaling indicating the UE capability to indicate that simultaneous transmission of uplink messages on two or more carriers is supported by the UE.

Aspect 3: The method of aspect 2, further comprising: applying the mapping from the combination of radio frequency bands to the at least one of the subset of carriers, wherein the combination of radio frequency bands includes a first radio frequency band associated with a first NUL carrier of the at least two NUL carriers and a second radio frequency band associated with a second NUL carrier of the at least two NUL carriers, and wherein the at least one of the subset of carriers includes the first NUL carrier, the second NUL carrier, or both, for transmission of the uplink message.

Aspect 4: The method of aspect 1, wherein transmitting the first control signaling indicating the UE capability further comprises: transmitting the first control signaling indicating the UE capability to indicate that simultaneous transmission of uplink messages on two or more carriers is unsupported by the UE.

Aspect 5: The method of aspect 4, further comprising: applying the mapping from the combination of radio frequency bands to the at least one of the subset of carriers, wherein the combination of radio frequency bands includes a first radio frequency band associated with a first NUL carrier of the at least two NUL carriers and a second radio frequency band associated with a second NUL carrier of the at least two NUL carriers, and wherein the at least one of the subset of carriers includes the first NUL carrier for transmission of the uplink message based at least in part on switching from the second NUL carrier or being scheduled to switch to the second NUL carrier to transmit a next uplink message.

Aspect 6: The method of aspect 4, further comprising: applying the mapping from the combination of radio frequency bands to the at least one of the subset of carriers, wherein the combination of radio frequency bands includes a first radio frequency band associated with a first NUL carrier of the at least two NUL carriers and a second radio frequency band associated with a second NUL carrier of the at least two NUL carriers, and wherein the at least one of the subset of carriers includes the second NUL carrier for transmission of the uplink message based at least in part on switching from the first NUL carrier or being scheduled to switch to the first NUL carrier to transmit a next uplink message.

Aspect 7: The method of any of aspects 1, 2, or 4, further comprising: applying the mapping from the combination of radio frequency bands to the at least one of the subset of carriers, wherein the combination of radio frequency bands includes a first radio frequency band associated with the SUL carrier and a second radio frequency band associated with an NUL carrier of the at least two NUL carriers, and wherein the at least one of the subset of carriers includes the NUL carrier for transmission of the uplink message based at least in part on switching from the SUL carrier or being scheduled to switch to the SUL carrier to transmit a next uplink message.

Aspect 8: The method of any of aspects 1, 2, or 4, further comprising: applying the mapping from the combination of radio frequency bands to the at least one of the subset of carriers, wherein the combination of radio frequency bands includes a first radio frequency band associated with the SUL carrier and a second radio frequency band associated with an NUL carrier of the at least two NUL carriers, and wherein the at least one of the subset of carriers includes the SUL carrier for transmission of the uplink message based at least in part on switching from the NUL carrier or being scheduled to switch to the NUL carrier to transmit a next uplink message.

Aspect 9: The method of any of aspects 1, 2, or 4, further comprising: applying the mapping from the combination of radio frequency bands to the at least one of the subset of carriers, wherein the combination of radio frequency bands includes a radio frequency band associated with an NUL carrier of the at least two NUL carriers, and wherein the at least one of the subset of carriers includes the NUL carrier for transmission of the uplink message using one antenna port or two antenna ports.

Aspect 10: The method of any of aspects 1, 2, or 4, further comprising: applying the mapping from the combination of radio frequency bands to the at least one of the subset of carriers, wherein the combination of radio frequency bands includes a radio frequency band associated with the SUL carrier, and wherein the at least one of the subset of carriers includes the SUL carrier for transmission of the uplink message using one antenna port or two antenna ports.

Aspect 11: The method of any of aspects 1 through 10, further comprising: selecting the at least one of the subset of carriers in accordance with the mapping based at least in part on a previous subset of carriers of the group of carriers from which the UE is indicated to switch to the subset of carriers.

Aspect 12: The method of any of aspects 1 through 11, further comprising: selecting the at least one of the subset of carriers in accordance with the mapping based at least in part on a next subset of carriers of the group of carriers to which the UE is scheduled to switch from the subset of carriers.

Aspect 13: A method for wireless communication at a base station, comprising: receiving, from a UE, first control signaling indicating a UE capability for switching between carriers of a group of carriers during uplink communications using carrier aggregation, the group of carriers including three or more carriers that are each associated with different radio frequency bands and include an SUL carrier and at least two NUL carriers; transmitting, to the UE and in response to the first control signaling, second control signaling that includes an indication for the UE to switch to a subset of carriers of the group of carriers for transmission of an uplink message, wherein the subset of carriers is associated with a combination of radio frequency bands; and receiving the uplink message from the UE on at least one of the subset of carriers in accordance with a mapping between the combination of radio frequency bands and the at least one of the subset of carriers, wherein the mapping is based at least in part on the UE capability.

Aspect 14: The method of aspect 13, wherein the UE capability indicates that simultaneous transmission of uplink messages on two or more carriers is supported by the UE.

Aspect 15: The method of aspect 14, further comprising: applying the mapping from the combination of radio frequency bands to the at least one of the subset of carriers, wherein the combination of radio frequency bands includes a first radio frequency band associated with a first NUL carrier of the at least two NUL carriers and a second radio frequency band associated with a second NUL carrier of the at least two NUL carriers, and wherein the at least one of the subset of carriers includes the first NUL carrier, the second NUL carrier, or both, for transmission of the uplink message.

Aspect 16: The method of aspect 13, wherein the UE capability indicates that simultaneous transmission of uplink messages on more than one carrier is unsupported by the UE.

Aspect 17: The method of aspect 16, further comprising: applying the mapping from the combination of radio frequency bands to the at least one of the subset of carriers, wherein the combination of radio frequency bands includes a first radio frequency band associated with a first NUL carrier of the at least two NUL carriers and a second radio frequency band associated with a second NUL carrier of the at least two NUL carriers, and wherein the at least one of the subset of carriers includes the first NUL carrier for transmission of the uplink message based at least in part on switching from the second NUL carrier or being scheduled to switch to the second NUL carrier to transmit a next uplink message.

Aspect 18: The method of aspect 16, further comprising: applying the mapping from the combination of radio frequency bands to the at least one of the subset of carriers, wherein the combination of radio frequency bands includes a first radio frequency band associated with a first NUL carrier of the at least two NUL carriers and a second radio frequency band associated with a second NUL carrier of the at least two NUL carriers, and wherein the at least one of the subset of carriers includes the second NUL carrier for transmission of the uplink message based at least in part on switching from the first NUL carrier or being scheduled to switch to the first NUL carrier to transmit a next uplink message.

Aspect 19: The method of any of aspects 13, 14, or 16, further comprising: applying the mapping from the combination of radio frequency bands to the at least one of the subset of carriers, wherein the combination of radio frequency bands includes a first radio frequency band associated with the SUL carrier and a second radio frequency band associated with an NUL carrier of the at least two NUL carriers, and wherein the at least one of the subset of carriers includes the NUL carrier for transmission of the uplink message based at least in part on switching from the SUL carrier or being scheduled to switch to the SUL carrier to transmit a next uplink message.

Aspect 20: The method of any of aspects 13, 14, or 16, further comprising: applying the mapping from the combination of radio frequency bands to the at least one of the subset of carriers, wherein the combination of radio frequency bands includes a first radio frequency band associated with the SUL carrier and a second radio frequency band associated with an NUL carrier of the at least two NUL carriers, and wherein the at least one of the subset of carriers includes the SUL carrier for transmission of the uplink message based at least in part on switching from the NUL carrier or being scheduled to switch to the NUL carrier to transmit a next uplink message.

Aspect 21: The method of any of aspects 13, 14, or 16, further comprising: applying the mapping from the combination of radio frequency bands to the at least one of the subset of carriers, wherein the combination of radio frequency bands includes a radio frequency band associated with an NUL carrier of the at least two NUL carriers, and wherein the at least one of the subset of carriers includes the NUL carrier for transmission of the uplink message using one antenna port or two antenna ports.

Aspect 22: The method of any of aspects 13, 14, or 16, further comprising: applying the mapping from the combination of radio frequency bands to the at least one of the subset of carriers, wherein the combination of radio frequency bands includes a radio frequency band associated with the SUL carrier, and wherein the at least one of the subset of carriers includes the SUL carrier for transmission of the uplink message using one antenna port or two antenna ports.

Aspect 23: The method of any of aspects 13 through 22, wherein the mapping indicates the at least one of the subset of carriers based at least in part on a previous subset of carriers of the group of carriers from which the UE is indicated to switch to the subset of carriers.

Aspect 24: The method of any of aspects 13 through 23, wherein the mapping indicates the at least one of the subset of carriers based at least in part on a next subset of carriers of the group of carriers to which the UE is scheduled to switch from the subset of carriers.

Aspect 25: An apparatus for wireless communication a UE, comprising a processor; memory coupled with the processor; and instructions stored in the memory and executable by the processor to cause the apparatus to perform a method of any of aspects 1 through 12.

Aspect 26: An apparatus for wireless communication a UE, comprising at least one means for performing a method of any of aspects 1 through 12.

Aspect 27: A non-transitory computer-readable medium storing code for wireless communication a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication a user equipment (UE), comprising:

transmitting, to a base station, first control signaling indicating a UE capability for switching between carriers of a group of carriers during uplink communications using carrier aggregation, the group of carriers including three or more carriers that are each associated with different radio frequency bands and include a supplementary uplink carrier and at least two normal uplink carriers;

receiving, from the base station and in response to the first control signaling, second control signaling that includes an indication for the UE to switch to a subset of carriers of the group of carriers for transmission of an uplink message, wherein the subset of carriers is associated with a combination of radio frequency bands; and transmitting the uplink message to the base station on at least one of the subset of carriers in accordance with a mapping between the combination of radio frequency bands and the at least one of the subset of carriers, wherein the mapping is based at least in part on the UE capability.

2. The method of claim 1, wherein transmitting the first control signaling indicating the UE capability further comprises:

transmitting the first control signaling indicating the UE capability to indicate that simultaneous transmission of uplink messages on two or more carriers is supported by the UE.

3. The method of claim 2, further comprising:

applying the mapping from the combination of radio frequency bands to the at least one of the subset of carriers, wherein the combination of radio frequency bands includes a first radio frequency band associated with a first normal uplink carrier of the at least two normal uplink carriers and a second radio frequency band associated with a second normal uplink carrier of the at least two normal uplink carriers, and wherein the at least one of the subset of carriers includes the first normal uplink carrier, the second normal uplink carrier, or both, for transmission of the uplink message.

4. The method of claim 1, wherein transmitting the first control signaling indicating the UE capability further comprises:

transmitting the first control signaling indicating the UE capability to indicate that simultaneous transmission of uplink messages on two or more carriers is unsupported by the UE.

5. The method of claim 4, further comprising:

applying the mapping from the combination of radio frequency bands to the at least one of the subset of carriers, wherein the combination of radio frequency bands includes a first radio frequency band associated with a first normal uplink carrier of the at least two normal uplink carriers and a second radio frequency band associated with a second normal uplink carrier of the at least two normal uplink carriers, and wherein the at least one of the subset of carriers includes the first normal uplink carrier for transmission of the uplink message based at least in part on switching from the second normal uplink carrier or being scheduled to switch to the second normal uplink carrier to transmit a next uplink message.

6. The method of claim 4, further comprising:

applying the mapping from the combination of radio frequency bands to the at least one of the subset of carriers, wherein the combination of radio frequency bands includes a first radio frequency band associated with a first normal uplink carrier of the at least two normal uplink carriers and a second radio frequency band associated with a second normal uplink carrier of the at least two normal uplink carriers, and wherein the at least one of the subset of carriers includes the second normal uplink carrier for transmission of the uplink message based at least in part on switching from the first normal uplink carrier or being scheduled to switch to the first normal uplink carrier to transmit a next uplink message.

7. The method of claim 1, further comprising:

applying the mapping from the combination of radio frequency bands to the at least one of the subset of carriers, wherein the combination of radio frequency bands includes a first radio frequency band associated with the supplementary uplink carrier and a second radio frequency band associated with a normal uplink carrier of the at least two normal uplink carriers, and wherein the at least one of the subset of carriers includes the normal uplink carrier for transmission of the uplink message based at least in part on switching from the supplementary uplink carrier or being scheduled to switch to the supplementary uplink carrier to transmit a next uplink message.

8. The method of claim 1, further comprising:

applying the mapping from the combination of radio frequency bands to the at least one of the subset of carriers, wherein the combination of radio frequency bands includes a first radio frequency band associated with the supplementary uplink carrier and a second radio frequency band associated with a normal uplink carrier of the at least two normal uplink carriers, and wherein the at least one of the subset of carriers includes the supplementary uplink carrier for transmission of the uplink message based at least in part on switching from the normal uplink carrier or being scheduled to switch to the normal uplink carrier to transmit a next uplink message.

9. The method of claim 1, further comprising:

applying the mapping from the combination of radio frequency bands to the at least one of the subset of carriers, wherein the combination of radio frequency bands includes a radio frequency band associated with a normal uplink carrier of the at least two normal uplink carriers, and wherein the at least one of the subset of carriers includes the normal uplink carrier for transmission of the uplink message using one antenna port or two antenna ports.

10. The method of claim 1, further comprising:

applying the mapping from the combination of radio frequency bands to the at least one of the subset of carriers, wherein the combination of radio frequency bands includes a radio frequency band associated with the supplementary uplink carrier, and wherein the at least one of the subset of carriers includes the supplementary uplink carrier for transmission of the uplink message using one antenna port or two antenna ports.

11. The method of claim 1, further comprising:

selecting the at least one of the subset of carriers in accordance with the mapping based at least in part on a previous subset of carriers of the group of carriers from which the UE is indicated to switch to the subset of carriers.

12. The method of claim 1, further comprising:

selecting the at least one of the subset of carriers in accordance with the mapping based at least in part on a next subset of carriers of the group of carriers to which the UE is scheduled to switch from the subset of carriers.

13. A method for wireless communication at a base station, comprising:

receiving, from a user equipment (UE), first control signaling indicating a UE capability for switching between carriers of a group of carriers during uplink communications using carrier aggregation, the group of carriers including three or more carriers that are each associated with different radio frequency bands and include a supplementary uplink carrier and at least two normal uplink carriers;

transmitting, to the UE and in response to the first control signaling, second control signaling that includes an indication for the UE to switch to a subset of carriers of the group of carriers for transmission of an uplink message, wherein the subset of carriers is associated with a combination of radio frequency bands; and receiving the uplink message from the UE on at least one of the subset of carriers in accordance with a mapping between the combination of radio frequency bands and the at least one of the subset of carriers, wherein the mapping is based at least in part on the UE capability.

14. The method of claim 13, wherein the UE capability indicates that simultaneous transmission of uplink messages on two or more carriers is supported by the UE.

15. The method of claim 14, further comprising:

applying the mapping from the combination of radio frequency bands to the at least one of the subset of carriers, wherein the combination of radio frequency bands includes a first radio frequency band associated with a first normal uplink carrier of the at least two normal uplink carriers and a second radio frequency band associated with a second normal uplink carrier of the at least two normal uplink carriers, and wherein the at least one of the subset of carriers includes the first normal uplink carrier, the second normal uplink carrier, or both, for transmission of the uplink message.

16. The method of claim 13, wherein the UE capability indicates that simultaneous transmission of uplink messages on more than one carrier is unsupported by the UE.

17. The method of claim 16, further comprising:

applying the mapping from the combination of radio frequency bands to the at least one of the subset of carriers, wherein the combination of radio frequency bands includes a first radio frequency band associated with a first normal uplink carrier of the at least two normal uplink carriers and a second radio frequency band associated with a second normal uplink carrier of the at least two normal uplink carriers, and wherein the at least one of the subset of carriers includes the first normal uplink carrier for transmission of the uplink message based at least in part on switching from the second normal uplink carrier or being scheduled to switch to the second normal uplink carrier to transmit a next uplink message.

18. The method of claim 16, further comprising:

applying the mapping from the combination of radio frequency bands to the at least one of the subset of carriers, wherein the combination of radio frequency bands includes a first radio frequency band associated with a first normal uplink carrier of the at least two normal uplink carriers and a second radio frequency band associated with a second normal uplink carrier of the at least two normal uplink carriers, and wherein the at least one of the subset of carriers includes the second normal uplink carrier for transmission of the uplink message based at least in part on switching from the first normal uplink carrier or being scheduled to switch to the first normal uplink carrier to transmit a next uplink message.

19. The method of claim 13, further comprising:

applying the mapping from the combination of radio frequency bands to the at least one of the subset of carriers, wherein the combination of radio frequency bands includes a first radio frequency band associated with the supplementary uplink carrier and a second radio frequency band associated with a normal uplink carrier of the at least two normal uplink carriers, and wherein the at least one of the subset of carriers includes the normal uplink carrier for transmission of the uplink message based at least in part on switching from the supplementary uplink carrier or being scheduled to switch to the supplementary uplink carrier to transmit a next uplink message.

20. The method of claim 13, further comprising:

applying the mapping from the combination of radio frequency bands to the at least one of the subset of carriers, wherein the combination of radio frequency bands includes a first radio frequency band associated with the supplementary uplink carrier and a second radio frequency band associated with a normal uplink carrier of the at least two normal uplink carriers, and wherein the at least one of the subset of carriers includes the supplementary uplink carrier for transmission of the uplink message based at least in part on switching from the normal uplink carrier or being scheduled to switch to the normal uplink carrier to transmit a next uplink message.

21. The method of claim 13, further comprising:

applying the mapping from the combination of radio frequency bands to the at least one of the subset of carriers, wherein the combination of radio frequency bands includes a radio frequency band associated with a normal uplink carrier of the at least two normal uplink carriers, and wherein the at least one of the subset of carriers includes the normal uplink carrier for transmission of the uplink message using one antenna port or two antenna ports.

22. The method of claim 13, further comprising:

applying the mapping from the combination of radio frequency bands to the at least one of the subset of carriers, wherein the combination of radio frequency bands includes a radio frequency band associated with the supplementary uplink carrier, and wherein the at least one of the subset of carriers includes the supplementary uplink carrier for transmission of the uplink message using one antenna port or two antenna ports.

23. The method of claim 13, wherein the mapping indicates the at least one of the subset of carriers based at least in part on a previous subset of carriers of the group of carriers from which the UE is indicated to switch to the subset of carriers.

24. The method of claim 13, wherein the mapping indicates the at least one of the subset of carriers based at least in part on a next subset of carriers of the group of carriers to which the UE is scheduled to switch from the subset of carriers.

25. A user equipment (UE), comprising:

a processor;

memory coupled with the processor; and instructions stored in the memory and executable by the processor to cause the UE to:

transmit, to a base station, first control signaling indicating a UE capability for switching between carriers of a group of carriers during uplink communications using carrier aggregation, the group of carriers including three or more carriers that are each associated with different radio frequency bands and include a supplementary uplink carrier and at least two normal uplink carriers;

receive, from the base station and in response to the first control signaling, second control signaling that includes an indication for the UE to switch to a subset of carriers of the group of carriers for transmission of an uplink message, wherein the subset of carriers is associated with a combination of radio frequency bands; and transmit the uplink message to the base station on at least one of the subset of carriers in accordance with a mapping between the combination of radio frequency bands and the at least one of the subset of carriers, wherein the mapping is based at least in part on the UE capability.

26. The UE of claim 25, wherein the instructions are further executable by the processor to cause the UE to:

apply the mapping from the combination of radio frequency bands to the at least one of the subset of carriers, wherein the combination of radio frequency bands includes a first radio frequency band associated with the supplementary uplink carrier and a second radio frequency band associated with a normal uplink carrier of the at least two normal uplink carriers, and wherein the at least one of the subset of carriers includes the normal uplink carrier for transmission of the uplink message based at least in part on switching from the supplementary uplink carrier or being scheduled to switch to the supplementary uplink carrier to transmit a next uplink message.

27. The UE of claim 25, wherein the instructions are further executable by the processor to cause the UE to:

select the at least one of the subset of carriers in accordance with the mapping based at least in part on a previous subset of carriers of the group of carriers from which the UE is indicated to switch to the subset of carriers.

28. The UE of claim 25, wherein the instructions are further executable by the processor to cause the UE to:

select the at least one of the subset of carriers in accordance with the mapping based at least in part on a next subset of carriers of the group of carriers to which the UE is scheduled to switch from the subset of carriers.

29. A base station, comprising:

a processor;

memory coupled with the processor; and instructions stored in the memory and executable by the processor to cause the base station to:

receive, from a user equipment (UE), first control signaling indicating a UE capability for switching between carriers of a group of carriers during uplink communications using carrier aggregation, the group of carriers including three or more carriers that are each associated with different radio frequency bands and include a supplementary uplink carrier and at least two normal uplink carriers;

transmit, to the UE and in response to the first control signaling, second control signaling that includes an indication for the UE to switch to a subset of carriers of the group of carriers for transmission of an uplink message, wherein the subset of carriers is associated with a combination of radio frequency bands; and receive the uplink message from the UE on at least one of the subset of carriers in accordance with a mapping between the combination of radio frequency bands and the at least one of the subset of carriers, wherein the mapping is based at least in part on the UE capability.

30. The base station of claim 29, wherein the instructions are further executable by the processor to cause the base station to:

apply the mapping from the combination of radio frequency bands to the at least one of the subset of carriers, wherein the combination of radio frequency bands includes a first radio frequency band associated with the supplementary uplink carrier and a second radio frequency band associated with a normal uplink carrier of the at least two normal uplink carriers, and wherein the at least one of the subset of carriers includes the normal uplink carrier for transmission of the uplink message based at least in part on switching from the supplementary uplink carrier or being scheduled to switch to the supplementary uplink carrier to transmit a next uplink message.

* * * * *